US006811489B1

(12) United States Patent
Shimizu et al.

(10) Patent No.: US 6,811,489 B1
(45) Date of Patent: Nov. 2, 2004

(54) CONTROLLER INTERFACE FOR A GRAPHICS SYSTEM

(75) Inventors: Dan Shimizu, Palo Alto, CA (US); Ko Shiota, Kyoto (JP); Munehito Oira, Kyoto (JP); Kazuo Koshima, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 65 days.

(21) Appl. No.: 09/722,664

(22) Filed: Nov. 28, 2000

Related U.S. Application Data

(60) Provisional application No. 60/226,885, filed on Aug. 23, 2000.

(51) Int. Cl.[7] ............................. G06F 19/00; G06F 3/00
(52) U.S. Cl. ................................ 463/43; 463/1; 710/1; 710/19; 710/21; 710/53
(58) Field of Search .......................... 463/1, 30, 36–39, 463/41–43; 273/148 B, 459–461; 700/90, 306; 710/1, 4, 19–21, 36, 46, 52–53, 220; 711/1, 100, 109; 345/418–419, 422, 661, 682, 716, 156, 161, 167–168, 179–180, 501, 506, 520, 530, 532–537, 539, 555–556, 558–559, 949, 667

(56) References Cited

U.S. PATENT DOCUMENTS

| | | | |
|---|---|---|---|
| 4,275,413 A | 6/1981 | Sakamoto et al. | |
| 4,357,624 A | 11/1982 | Greenberg | |
| 4,388,620 A | 6/1983 | Sherman | |
| 4,425,559 A | 1/1984 | Sherman | |
| 4,463,380 A | 7/1984 | Hooks, Jr. | |
| 4,491,836 A | 1/1985 | Collmeyer et al. | |
| 4,570,233 A | 2/1986 | Yan et al. | |
| 4,586,038 A | 4/1986 | Sims et al. | |
| 4,600,919 A | 7/1986 | Stern | |
| 4,615,013 A | 9/1986 | Yan et al. | |

(List continued on next page.)

FOREIGN PATENT DOCUMENTS

| | | |
|---|---|---|
| CA | 2070934 | 12/1993 |
| EP | 0 637 813 A2 | 2/1995 |
| EP | 1 074 945 | 2/2001 |
| EP | 1 075 146 | 2/2001 |
| EP | 1 081 649 | 3/2001 |
| JP | 9-330230 | 12/1997 |
| JP | 11053580 | 2/1999 |
| JP | 11076614 | 3/1999 |

(List continued on next page.)

OTHER PUBLICATIONS

GDC 2000: Advanced OpenGL Game Development, "A Practical and Robust Bump–mapping Technique for Today's GPUs," by Mark Kilgard, Jul. 5, 2000, www.nvidia.com.

Technical Presentations: "Texture Space Bump Mapping," Sim Dietrich, Nov. 10, 2000, www.nvidia.com.

Whitepapers: "Texture Addressing," Sim Dietrich, Jan. 6, 2000, www.nvidia.com.

White paper, Huddy, Richard, "The Efficient Use of Vertex Buffers," (Nov. 1, 2000).

White paper, Spitzer, John, et al., "Using GL_NV_array_range and GL_NV_Fence on GEForce Products and Beyond" (Aug. 1, 2000).

(List continued on next page.)

*Primary Examiner*—Jessica Harrison
*Assistant Examiner*—Scott E. Jones
(74) *Attorney, Agent, or Firm*—Nixon & Vanderhye, P.C.

(57) ABSTRACT

A video game system includes a game program executing system executing a game program and one or more controllers supplying user inputs to the game program executing system. An interface between the controllers and the game program executing system is programmable to periodically poll the controller without involvement of the game program executing system.

43 Claims, 19 Drawing Sheets

EXAMPLE SERIAL INTERFACE

U.S. PATENT DOCUMENTS

| | | |
|---|---|---|
| 4,625,289 A | 11/1986 | Rockwood |
| 4,653,012 A | 3/1987 | Duffy et al. |
| 4,658,247 A | 4/1987 | Gharachorloo |
| 4,692,880 A | 9/1987 | Merz et al. |
| 4,695,943 A | 9/1987 | Keeley et al. |
| 4,710,876 A | 12/1987 | Cline et al. |
| 4,725,831 A | 2/1988 | Coleman |
| 4,768,148 A | 8/1988 | Keeley et al. |
| 4,785,395 A | 11/1988 | Keeley |
| 4,790,025 A | 12/1988 | Inoue et al. |
| 4,808,988 A | 2/1989 | Burke et al. |
| 4,812,988 A | 3/1989 | Duthuit et al. |
| 4,817,175 A | 3/1989 | Tenenbaum et al. |
| 4,829,295 A | 5/1989 | Hiroyuki |
| 4,829,452 A | 5/1989 | Kang et al. |
| 4,833,601 A | 5/1989 | Barlow et al. |
| 4,855,934 A | 8/1989 | Robinson |
| 4,862,392 A | 8/1989 | Steiner |
| 4,866,637 A | 9/1989 | Gonzalez-Lopez et al. |
| 4,888,712 A | 12/1989 | Barkans et al. |
| 4,897,806 A | 1/1990 | Cook et al. |
| 4,901,064 A | 2/1990 | Deering |
| 4,907,174 A | 3/1990 | Priem |
| 4,914,729 A | 4/1990 | Omori et al. |
| 4,918,625 A | 4/1990 | Yan |
| 4,935,879 A | 6/1990 | Ueda |
| 4,945,500 A | 7/1990 | Deering |
| 4,965,751 A | 10/1990 | Thayer et al. |
| 4,974,176 A | 11/1990 | Buchner et al. |
| 4,974,177 A | 11/1990 | Nishiguchi |
| 4,975,977 A | 12/1990 | Kurosu et al. |
| 4,989,138 A | 1/1991 | Radochonski |
| 5,003,496 A | 3/1991 | Hunt, Jr. et al. |
| 5,016,183 A | 5/1991 | Shyong |
| 5,018,076 A | 5/1991 | Johary et al. |
| 5,043,922 A | 8/1991 | Matsumoto |
| 5,056,044 A | 10/1991 | Frederickson et al. |
| 5,062,057 A | 10/1991 | Blacken et al. |
| 5,086,495 A | 2/1992 | Gray et al. |
| 5,091,967 A | 2/1992 | Ohsawa |
| 5,097,427 A | 3/1992 | Lathrop et al. |
| 5,136,664 A | 8/1992 | Bersack et al. |
| 5,144,291 A | 9/1992 | Nishizawa |
| 5,163,126 A | 11/1992 | Einkauf et al. |
| 5,170,468 A | 12/1992 | Shah et al. |
| 5,179,638 A | 1/1993 | Dawson et al. |
| 5,204,944 A | 4/1993 | Wolberg et al. |
| 5,224,208 A | 6/1993 | Miller, Jr. et al. |
| 5,239,624 A | 8/1993 | Cook et al. |
| 5,241,658 A | 8/1993 | Masterson et al. |
| 5,255,353 A | 10/1993 | Itoh |
| 5,268,995 A | 12/1993 | Diefendorff et al. |
| 5,268,996 A | 12/1993 | Steiner et al. |
| 5,278,948 A | 1/1994 | Luken, Jr. |
| 5,307,450 A | 4/1994 | Grossman |
| 5,315,692 A | 5/1994 | Hansen et al. |
| 5,345,541 A | 9/1994 | Kelley et al. |
| 5,353,424 A | 10/1994 | Partovi et al. |
| 5,357,579 A | 10/1994 | Buchner et al. |
| 5,361,386 A | 11/1994 | Watkins et al. |
| 5,363,475 A | 11/1994 | Baker et al. |
| 5,377,313 A | 12/1994 | Scheibl |
| 5,392,385 A | 2/1995 | Evangelisti et al. |
| 5,392,393 A | 2/1995 | Deering |
| 5,394,516 A | 2/1995 | Winser |
| 5,402,532 A | 3/1995 | Epstein et al. |
| 5,404,445 A | 4/1995 | Matsumoto |
| 5,408,650 A | 4/1995 | Arsenault |
| 5,412,796 A | 5/1995 | Olive |
| 5,415,549 A | 5/1995 | Logg |
| 5,416,606 A | 5/1995 | Katayama et al. |
| 5,421,028 A | 5/1995 | Swanson |
| 5,422,997 A | 6/1995 | Nagashima |
| 5,432,895 A | 7/1995 | Myers |
| 5,432,900 A | 7/1995 | Rhodes et al. |
| 5,438,663 A | 8/1995 | Matsumoto et al. |
| 5,448,689 A | 9/1995 | Matsuo et al. |
| 5,457,775 A | 10/1995 | Johnson, Jr. et al. |
| 5,461,712 A | 10/1995 | Chelstowski et al. |
| 5,467,438 A | 11/1995 | Nishio et al. |
| 5,467,459 A | 11/1995 | Alexander et al. |
| 5,469,535 A | 11/1995 | Jarvis et al. |
| 5,473,736 A | 12/1995 | Young |
| 5,475,803 A | 12/1995 | Stearns et al. |
| 5,487,146 A | 1/1996 | Guttag et al. |
| 5,490,240 A | 2/1996 | Foran et al. |
| 5,495,563 A | 2/1996 | Winser |
| 5,504,499 A | 4/1996 | Horie et al. |
| 5,504,917 A | 4/1996 | Austin |
| 5,506,604 A | 4/1996 | Nally et al. |
| 5,535,374 A | 7/1996 | Olive |
| 5,543,824 A | 8/1996 | Priem et al. |
| 5,544,292 A | 8/1996 | Winser |
| 5,548,709 A | 8/1996 | Hannah et al. |
| 5,553,228 A | 9/1996 | Erb et al. |
| 5,557,712 A | 9/1996 | Guay |
| 5,559,954 A | 9/1996 | Sakoda et al. |
| 5,561,746 A | 10/1996 | Murata et al. |
| 5,561,752 A | 10/1996 | Jevans |
| 5,563,989 A | 10/1996 | Billyard |
| 5,566,285 A | 10/1996 | Okada |
| 5,573,402 A | 11/1996 | Gray |
| 5,579,456 A | 11/1996 | Cosman |
| 5,586,234 A | 12/1996 | Sakuraba et al. |
| 5,593,350 A * | 1/1997 | Bouton et al. .......... 273/148 B |
| 5,594,854 A | 1/1997 | Baldwin et al. |
| 5,600,763 A | 2/1997 | Greene et al. |
| 5,606,650 A | 2/1997 | Kelley et al. |
| 5,607,157 A | 3/1997 | Nagashima ................. 273/148 |
| 5,608,424 A | 3/1997 | Takahashi et al. |
| 5,608,864 A | 3/1997 | Bindlish et al. |
| 5,616,031 A | 4/1997 | Logg |
| 5,621,867 A | 4/1997 | Murata et al. |
| 5,628,686 A * | 5/1997 | Svancarek et al. ............ 463/36 |
| 5,638,535 A * | 6/1997 | Rosenthal et al. ............. 710/1 |
| 5,644,364 A | 7/1997 | Kurtze et al. |
| 5,649,082 A | 7/1997 | Burns |
| 5,650,955 A | 7/1997 | Puar et al. |
| 5,651,104 A | 7/1997 | Cosman |
| 5,657,045 A | 8/1997 | Katsura et al. |
| 5,657,443 A | 8/1997 | Krech, Jr. |
| 5,657,478 A | 8/1997 | Recker et al. |
| 5,659,671 A | 8/1997 | Tannenbaum et al. |
| 5,659,673 A | 8/1997 | Nonoshita |
| 5,659,715 A | 8/1997 | Wu et al. |
| 5,664,162 A | 9/1997 | Dye |
| 5,666,439 A | 9/1997 | Ishida et al. |
| 5,678,037 A | 10/1997 | Osugi et al. |
| 5,682,522 A | 10/1997 | Huang et al. |
| 5,684,941 A | 11/1997 | Dye |
| 5,687,304 A | 11/1997 | Kiss |
| 5,687,357 A | 11/1997 | Priem |
| 5,691,746 A | 11/1997 | Shyu |
| 5,694,143 A | 12/1997 | Fielder et al. |
| 5,696,892 A | 12/1997 | Redmann et al. |
| 5,701,444 A | 12/1997 | Baldwin |
| 5,703,806 A | 12/1997 | Puar et al. |
| 5,706,481 A | 1/1998 | Hannah et al. |
| 5,706,482 A | 1/1998 | Matsushima et al. |
| 5,714,981 A | 2/1998 | Scott-Jackson et al. ..... 345/161 |
| 5,721,947 A | 2/1998 | Priem et al. |

| | | | | | |
|---|---|---|---|---|---|
| 5,724,561 A | 3/1998 | Tarolli et al. | 5,870,098 A | 2/1999 | Gardiner |
| 5,726,689 A | 3/1998 | Negishi et al. | 5,870,102 A | 2/1999 | Tarolli et al. |
| 5,726,947 A | 3/1998 | Yamazaki et al. | 5,870,109 A | 2/1999 | McCormack et al. |
| 5,727,192 A | 3/1998 | Baldwin | 5,870,587 A | 2/1999 | Danforth et al. |
| 5,734,386 A | 3/1998 | Cosman | 5,872,902 A | 2/1999 | Kuchkuda et al. |
| 5,739,819 A | 4/1998 | Bar-Nahum | 5,874,969 A | 2/1999 | Storm et al. |
| 5,740,343 A | 4/1998 | Tarolli et al. | 5,877,741 A | 3/1999 | Chee et al. |
| 5,740,383 A | 4/1998 | Nally et al. | 5,877,770 A | 3/1999 | Hanaoka |
| 5,740,406 A | 4/1998 | Rosenthal et al. | 5,877,771 A | 3/1999 | Drebin et al. |
| 5,742,749 A | 4/1998 | Foran et al. | 5,880,736 A | 3/1999 | Peercy et al. |
| 5,742,788 A | 4/1998 | Priem et al. | 5,880,737 A | 3/1999 | Griffin et al. |
| 5,745,118 A | 4/1998 | Alcorn et al. | 5,883,638 A | 3/1999 | Rouet et al. |
| 5,745,125 A | 4/1998 | Deering et al. | 5,886,701 A | 3/1999 | Chauvin et al. |
| 5,748,199 A | 5/1998 | Palm | 5,886,705 A | 3/1999 | Lentz |
| 5,748,986 A | 5/1998 | Butterfield et al. | 5,887,155 A | 3/1999 | Laidig |
| 5,751,291 A | 5/1998 | Olsen et al. | 5,890,190 A | 3/1999 | Rutman |
| 5,751,292 A | 5/1998 | Emmot | 5,892,517 A | 4/1999 | Rich |
| 5,751,295 A | 5/1998 | Becklund et al. | 5,892,974 A | 4/1999 | Koizumi et al. ............ 395/836 |
| 5,751,930 A | 5/1998 | Katsura et al. | 5,894,300 A | 4/1999 | Takizawa |
| 5,754,191 A | 5/1998 | Mills et al. | 5,900,881 A | 5/1999 | Ikedo |
| 5,757,382 A | 5/1998 | Lee | 5,903,283 A | 5/1999 | Selwan et al. |
| 5,758,182 A | 5/1998 | Rosenthal et al. | 5,909,218 A | 6/1999 | Naka et al. |
| 5,760,783 A | 6/1998 | Migdal et al. | 5,909,225 A | 6/1999 | Schinnerer et al. |
| 5,764,228 A | 6/1998 | Baldwin | 5,912,675 A | 6/1999 | Laperriere |
| 5,764,237 A | 6/1998 | Kaneko | 5,912,676 A | 6/1999 | Malladi et al. |
| 5,764,243 A | 6/1998 | Baldwin | 5,914,721 A | 6/1999 | Lim |
| 5,767,856 A | 6/1998 | Peterson et al. | 5,914,725 A | 6/1999 | MacInnis et al. |
| 5,767,858 A | 6/1998 | Kawase et al. | 5,914,729 A | 6/1999 | Lippincott |
| 5,768,626 A | 6/1998 | Munson et al. | 5,917,496 A | 6/1999 | Fujita et al. |
| 5,768,629 A | 6/1998 | Wise et al. | 5,920,326 A | 7/1999 | Rentschler et al. |
| 5,774,133 A | 6/1998 | Neave et al. | 5,920,876 A | 7/1999 | Ungar et al. |
| 5,777,623 A | 7/1998 | Small | 5,923,332 A | 7/1999 | Izawa |
| 5,777,629 A | 7/1998 | Baldwin | 5,923,334 A | 7/1999 | Luken |
| 5,781,927 A | 7/1998 | Wu et al. | 5,926,182 A | 7/1999 | Menon et al. |
| 5,791,994 A | 8/1998 | Hirano et al. .................. 463/43 | 5,926,647 A | 7/1999 | Adams et al. |
| 5,798,770 A | 8/1998 | Baldwin | 5,933,150 A | 8/1999 | Ngo et al. |
| 5,801,706 A | 9/1998 | Fujita et al. | 5,933,154 A | 8/1999 | Howard et al. |
| 5,801,711 A | 9/1998 | Koss et al. | 5,933,155 A | 8/1999 | Akeley |
| 5,801,716 A | 9/1998 | Silverbrook | 5,933,529 A | 8/1999 | Kim |
| 5,801,720 A | 9/1998 | Norrod et al. | 5,936,641 A | 8/1999 | Jain et al. |
| 5,805,175 A | 9/1998 | Priem | 5,936,683 A | 8/1999 | Lin |
| 5,805,868 A | 9/1998 | Murphy | 5,940,086 A | 8/1999 | Rentschler et al. |
| 5,808,619 A | 9/1998 | Choi et al. | 5,940,089 A | 8/1999 | Dilliplane |
| 5,808,630 A | 9/1998 | Pannell | 5,940,538 A | 8/1999 | Spiegel et al. |
| 5,809,219 A | 9/1998 | Pearce et al. | 5,943,058 A | 8/1999 | Nagy |
| 5,809,278 A | 9/1998 | Watanabe et al. | 5,943,060 A | 8/1999 | Cosman et al. |
| 5,815,165 A | 9/1998 | Blixt | 5,945,997 A | 8/1999 | Zhao et al. |
| 5,815,166 A | 9/1998 | Baldwin | 5,949,421 A | 9/1999 | Ogletree et al. |
| 5,818,456 A | 10/1998 | Cosman et al. | 5,949,423 A | 9/1999 | Olsen |
| 5,819,017 A | 10/1998 | Akeley et al. | 5,949,424 A | 9/1999 | Cabral et al. |
| 5,821,940 A | 10/1998 | Morgan et al. | 5,949,428 A | 9/1999 | Toelle et al. |
| 5,821,949 A | 10/1998 | Deering | 5,949,440 A | 9/1999 | Krech, Jr. et al. |
| 5,822,516 A | 10/1998 | Krech, Jr. | 5,956,042 A | 9/1999 | Tucker et al. |
| 5,828,382 A | 10/1998 | Wilde | 5,956,043 A | 9/1999 | Jensen |
| 5,828,383 A | 10/1998 | May et al. | 5,958,020 A | 9/1999 | Evoy et al. .................... 710/3 |
| 5,828,907 A | 10/1998 | Wise et al. | 5,959,640 A | 9/1999 | Rudin et al. |
| 5,831,624 A | 11/1998 | Tarolli et al. | 5,963,220 A | 10/1999 | Lee et al. |
| 5,831,625 A | 11/1998 | Rich et al. | 5,966,134 A | 10/1999 | Arias |
| 5,831,640 A | 11/1998 | Wang et al. | 5,969,726 A | 10/1999 | Rentschler et al. |
| 5,835,096 A | 11/1998 | Baldwin | 5,977,979 A | 11/1999 | Clough et al. |
| 5,835,792 A | 11/1998 | Wise et al. | 5,977,984 A | 11/1999 | Omori |
| 5,838,334 A | 11/1998 | Dye | 5,982,376 A | 11/1999 | Abe et al. |
| 5,844,576 A | 12/1998 | Wilde et al. | 5,982,390 A | 11/1999 | Stoneking et al. |
| 5,850,229 A | 12/1998 | Edelsbrunner et al. | 5,986,659 A | 11/1999 | Gallery et al. |
| 5,852,451 A | 12/1998 | Cox et al. | 5,986,663 A | 11/1999 | Wilde |
| 5,856,829 A | 1/1999 | Gray, III et al. | 5,986,677 A | 11/1999 | Jones et al. |
| 5,859,645 A | 1/1999 | Latham | 5,987,567 A | 11/1999 | Rivard et al. |
| 5,861,888 A | 1/1999 | Dempsey | 5,990,903 A | 11/1999 | Donovan |
| 5,861,893 A | 1/1999 | Sturgess | 5,995,120 A | 11/1999 | Dye |
| 5,867,166 A | 2/1999 | Myhrvold et al. | 5,995,121 A | 11/1999 | Alcorn et al. |
| 5,870,097 A | 2/1999 | Snyder et al. | 5,999,189 A | 12/1999 | Kajiya et al. |

| | | | | | |
|---|---|---|---|---|---|
| 5,999,196 A | 12/1999 | Storm et al. | 6,088,701 A | 7/2000 | Whaley et al. |
| 5,999,198 A | 12/1999 | Horan et al. | 6,091,431 A | 7/2000 | Saxena et al. |
| 6,002,407 A | 12/1999 | Fadden | 6,092,124 A | 7/2000 | Priem et al. |
| 6,002,409 A | 12/1999 | Harkin | 6,092,158 A | 7/2000 | Harriman et al. |
| 6,002,410 A | 12/1999 | Battle | 6,094,200 A | 7/2000 | Olsen et al. |
| 6,005,582 A | 12/1999 | Gabriel et al. | 6,097,435 A | 8/2000 | Stanger et al. |
| 6,005,583 A | 12/1999 | Morrison | 6,097,437 A | 8/2000 | Hwang |
| 6,005,584 A | 12/1999 | Kitamura et al. | 6,104,415 A | 8/2000 | Gossett |
| 6,007,428 A * | 12/1999 | Nishiumi et al. ............. 463/36 | 6,104,417 A | 8/2000 | Nielsen et al. |
| 6,008,820 A | 12/1999 | Chauvin et al. | 6,105,094 A | 8/2000 | Lindeman |
| 6,011,562 A | 1/2000 | Gagne et al. | 6,108,743 A | 8/2000 | Debs et al. |
| 6,011,565 A | 1/2000 | Kuo et al. | 6,111,582 A | 8/2000 | Jenkins |
| 6,014,144 A | 1/2000 | Nelson et al. | 6,111,584 A | 8/2000 | Murphy |
| 6,016,150 A | 1/2000 | Lengyel et al. | 6,115,047 A | 9/2000 | Deering |
| 6,016,151 A | 1/2000 | Lin | 6,115,049 A | 9/2000 | Winner et al. |
| 6,018,350 A | 1/2000 | Lee et al. | 6,118,462 A | 9/2000 | Margulis |
| 6,020,931 A | 2/2000 | Bilbrey et al. | 6,128,026 A | 10/2000 | Brothers, III |
| 6,021,417 A | 2/2000 | Massarksy | 6,144,365 A | 11/2000 | Young et al. |
| 6,022,274 A | 2/2000 | Takeda et al. ................ 463/44 | 6,144,387 A | 11/2000 | Liu et al. |
| 6,023,261 A | 2/2000 | Ugajin | 6,151,602 A | 11/2000 | Hejlsberg et al. |
| 6,023,738 A | 2/2000 | Priem et al. | 6,155,926 A | 12/2000 | Miyamoto et al. ............ 463/32 |
| 6,025,853 A | 2/2000 | Baldwin | 6,157,387 A | 12/2000 | Kotani |
| 6,026,182 A | 2/2000 | Lee et al. | 6,166,748 A | 12/2000 | Van Hook et al. .......... 345/522 |
| 6,028,608 A | 2/2000 | Jenkins | 6,172,678 B1 | 1/2001 | Shiraishi |
| 6,028,611 A | 2/2000 | Anderson et al. | 6,173,367 B1 | 1/2001 | Aleksic et al. |
| 6,031,542 A | 2/2000 | Wittig | 6,177,944 B1 | 1/2001 | Fowler et al. |
| 6,035,360 A | 3/2000 | Doidge et al. | 6,181,352 B1 | 1/2001 | Kirk et al. |
| 6,037,948 A | 3/2000 | Liepa | 6,191,794 B1 | 2/2001 | Priem et al. |
| 6,037,949 A | 3/2000 | DeRose et al. | 6,198,488 B1 | 3/2001 | Lindholm et al. |
| 6,038,031 A | 3/2000 | Murphy | 6,200,253 B1 * | 3/2001 | Nishiumi et al. ............. 463/47 |
| 6,038,348 A | 3/2000 | Carley | 6,204,851 B1 | 3/2001 | Netschke et al. |
| 6,040,843 A | 3/2000 | Monroe et al. | 6,215,496 B1 | 4/2001 | Szeliski et al. |
| 6,040,844 A | 3/2000 | Yamaguchi et al. | 6,215,497 B1 | 4/2001 | Leung |
| 6,041,010 A | 3/2000 | Puar et al. | 6,226,012 B1 | 5/2001 | Priem et al. |
| 6,043,804 A | 3/2000 | Greene | 6,226,713 B1 | 5/2001 | Mehrotra |
| 6,043,821 A | 3/2000 | Sprague et al. | 6,232,981 B1 | 5/2001 | Gossett |
| 6,046,746 A | 4/2000 | Deering | 6,236,413 B1 | 5/2001 | Gossett et al. |
| 6,046,747 A | 4/2000 | Saunders et al. | 6,239,810 B1 | 5/2001 | Van Hook et al. .......... 345/431 |
| 6,046,752 A | 4/2000 | Kirkland et al. | 6,252,608 B1 | 6/2001 | Snyder et al. |
| 6,049,337 A | 4/2000 | Van Overveld | 6,252,610 B1 | 6/2001 | Hussain |
| 6,049,338 A | 4/2000 | Anderson et al. | 6,264,558 B1 * | 7/2001 | Nishiumi et al. ............. 463/36 |
| 6,052,125 A | 4/2000 | Gardiner et al. | 6,268,861 B1 | 7/2001 | Sanz-Pastor et al. |
| 6,052,126 A | 4/2000 | Sakuraba et al. | 6,275,235 B1 | 8/2001 | Morgan, III |
| 6,052,127 A | 4/2000 | Vaswani et al. | 6,285,779 B1 | 9/2001 | Lapidous et al. |
| 6,052,129 A | 4/2000 | Fowler et al. | 6,292,194 B1 | 9/2001 | Powell, III |
| 6,052,133 A | 4/2000 | Kang | 6,329,997 B1 | 12/2001 | We et al. |
| 6,054,993 A | 4/2000 | Devic et al. | 6,331,856 B1 | 12/2001 | Van Hook et al. .......... 345/503 |
| 6,054,999 A | 4/2000 | Strandberg | 6,339,428 B1 | 1/2002 | Fowler et al. |
| 6,057,847 A | 5/2000 | Jenkins | 6,342,892 B1 | 1/2002 | Van Hook et al. .......... 345/503 |
| 6,057,849 A | 5/2000 | Haubner et al. | 6,353,438 B1 | 3/2002 | Van Hook |
| 6,057,851 A | 5/2000 | Luken et al. | 6,356,497 B1 | 3/2002 | Puar et al. |
| 6,057,852 A | 5/2000 | Krech, Jr. | 6,408,362 B1 | 6/2002 | Arimilli et al. |
| 6,057,859 A | 5/2000 | Handelman et al. | 6,417,858 B1 | 7/2002 | Bosch et al. |
| 6,057,861 A | 5/2000 | Lee et al. | 6,426,747 B1 | 7/2002 | Hoppe et al. |
| 6,057,862 A | 5/2000 | Margulis | 6,437,781 B1 | 8/2002 | Tucker et al. |
| 6,057,863 A | 5/2000 | Olarig | 6,459,429 B1 | 10/2002 | Deering |
| 6,061,462 A | 5/2000 | Tostevin et al. | 6,466,223 B1 | 10/2002 | Dorbie et al. |
| 6,064,392 A | 5/2000 | Rohner | 6,469,707 B1 | 10/2002 | Voorhies |
| 6,067,098 A | 5/2000 | Dye | 6,476,808 B1 | 11/2002 | Kuo et al. |
| 6,070,204 A * | 5/2000 | Poisner ...................... 707/101 | 6,476,822 B1 | 11/2002 | Burbank |
| 6,072,496 A | 6/2000 | Guenter et al. | 6,496,187 B1 | 12/2002 | Deering et al. |
| 6,075,543 A | 6/2000 | Akeley | | | |
| 6,075,546 A | 6/2000 | Hussain et al. | | FOREIGN PATENT DOCUMENTS | |
| 6,078,311 A * | 6/2000 | Pelkey ....................... 345/161 | JP | 11161819 | 6/1999 |
| 6,078,333 A | 6/2000 | Wittig et al. | JP | 11203500 | 7/1999 |
| 6,078,334 A | 6/2000 | Hanaoka et al. | JP | 11226257 | 8/1999 |
| 6,078,338 A | 6/2000 | Horan et al. | JP | 1125971 | 9/1999 |
| 6,081,274 A | 6/2000 | Shiraishi | JP | 11259678 | 9/1999 |
| 6,088,035 A | 7/2000 | Sudarsky et al. | JP | 2000-66985 | 3/2000 |
| 6,088,042 A | 7/2000 | Handelman et al. | JP | 2000-92390 | 3/2000 |
| 6,088,487 A | 7/2000 | Kurashige | JP | 2000-132704 | 5/2000 |

| | | |
|---|---|---|
| JP | 2000-132706 | 5/2000 |
| JP | 2000-149053 | 5/2000 |
| JP | 200-182077 | 6/2000 |
| JP | 2000-156875 | 6/2000 |
| JP | 2000-207582 | 7/2000 |
| JP | 2000-215325 | 8/2000 |
| WO | WO/93/04429 | 3/1993 |
| WO | WO 94/10641 | 5/1994 |
| WO | WO 94/10641 | 11/1994 |

OTHER PUBLICATIONS

White paper, Rogers, Douglas H., "Optimizing Direct3D for the GeForce 256" (Jan. 3, 2000).

Thompson, Tom, "Must–See 3–D Engines," Byte Magazine, printed from web site www.byte.com, 10 pages (Jun. 1996).

Thompson, Nigel, "Rendering with Immediate Mode," Microsoft Interactive Developer Column: Fun and Games, printed from web site msdn.microsoft.com, 8 pages (Mar. 1997).

"HOWTO: Animate Textures in Direct3D Immediate Mode," printed from web site support.microsoft.com, 3 pages (last reviewed Dec. 15, 2000).

INFO: Rendering a Triangle Using an Execute Buffer, printed from web site support.microsoft.com, 6 pages (last reviewed Oct. 20, 2000).

U.S. application Ser. No. 09/337,293, filed Jun. 21, 1999, Multi–Formate Vertex Data Processing Apparatus and Method [issued as U.S. Patent No. 6,501,479 B1 on Dec. 31, 2002].

Datasheet, SGS–Thomson Microelectronics, nVIDIA™, RIVA 128™ 128–Bit 3D Multimedia Accelerator (Oct. 1997).

ZDNet Reviews, from PC Magazine, "Other Enhancements," Jan. 15, 1999, wysiwyg://16/http://www4.zdnet.com . . . ies/reviews/0,4161,2188286,00.html.

ZDNet Reviews, from PC Magazine, "Screen Shot of Alpha–channel Transparency," Jan. 15, 1999, wysiwyg://16/http://www4.zdnet.com . . . ies/reviews/0,4161,2188286,00.html.

Blythe, David, 5.6 Transparency Mapping and Trimming with Alpha, http://toolbox.sgi.com/TasteOfDT/d . . . penGL/advanced98/notes/node41.html, Jun. 11, 1998.

Winner, Stephanie, et al., "Hardware Accelerated Rendering Of Antialiasing Using A Modified A–buffer Algorithm," Computer Graphics Proceedings, Annual Conference Series, 1997, pp 307–316.

Gibson, Simon, et al., "Interactive Rendering with Real–World Illumination," Rendering Techniques 2000; 11th Eurographics Workshop on Rendering, pp. 365–376 (Jun. 2000).

Segal, Mark, et al., "Fast Shadows and Lighting Effects Using Texture Mapping," Computer Graphics, 26, 2, pp. 249–252 (Jul. 1992).

White paper, Kilgard, Mark J., "Improving Shadows and Reflections via the Stencil Buffer" (Nov. 3, 1999).

Arkin, Alan, email, subject: "Texture distortion problem," from web site: HTTP://reality.sgi.com (Jul. 1997).

Moller, Tomas et al., "Real–Time Rendering," pp. 179–183 (AK Peters Ltd., 1999).

Williams, Lance, "Casting Curved Shadows on Curved Surfaces," Computer Graphics (SIGGRAPH '78 Proceedings), vol. 12, No. 3, pp. 270–274 (Aug. 1978).

Woo et al., "A Survey of Shadow Algoritms," IEEE Computer Graphics and Applications, vol. 10, No. 6, pp. 13–32 (Nov. 1990).

Heidrich et al., "Applications of Pixel Textures in Visualization and Realistic Image Synthesis," Proceedings 1999 Symposium On Interactive 3D Graphics, pp. 127–134 (Apr. 1999).

Hourcade et al, "Algorithms for Antialiased Cast Shadows", Computers and Graphics, vol. 9, No. 3, pp. 260–265 (1985).

Michael McCool, "Shadow Volume Reconstruction from Depth Maps", ACM Transactions on Graphics, vol. 19, No. 1, Jan. 2000, pp. 1–26.

RenderMan Artist Tools, PhotoRealistic RenderMan 3.8 User's Manual, Pixar (Aug. 1998).

RenderMan Interface Version 3.2 (Jul. 2000).

White paper, Dietrich, Sim, "Cartoon Rendering and Advanced Texture Features of the GeForce 256 Texture Matrix, Projective Textures, Cube Maps, Texture Coordinate Generation and DOTPRODUCT3 Texture Blending" (Dec. 16, 1999).

Peter J. Kovach, Inside Direct 3D, "Alpha Testing," ppp 289–291 (1999).

Raskar, Ramesh et al., "Image Precision Silhouette Edges," Symposium on Interactive 3D Graphics1999, Atlanta, 7 pages (Apr. 26–29, 1999).

Schlechtweg, Stefan et al., Rendering Line–Drawings with Limited Resources, Proceedings of GRAPHICON '96, 6th International Conference and Exhibition on Computer Graphics and Visualization in Russia, (St. Petersburg, Jul. 1–5, 1996) vol. 2, pp 131–137.

Haeberli, Paul et al., "Texture Mapping as a Fundamental Drawing Primitive," Proceedings of the Fourth Eurographics Workshop on Rendering, 11pages, Paris, France (Jun. 1993).

Feth, Bill, "Non–Photorealistic Rendering," wif3@cornerll.edu, CS490—Bruce Land, 5 pages (Spring 1998).

Elber, Gershon, "Line Art Illustrations of Parametric and Implicit Forms," IEEE Transactions on Visualization and Computer Graphics, vol. 4, No. 1, Jan.–Mar. 1998.

Zeleznik, Robert et al."SKETCH: An Interfrace for Sketching 3D Scenes," Computer Graphics Proceedings, Annual Conference Series 1996, pp. 163–170.

Computer Graphics World, Dec. 1997.

Reynolds, Craig, "Stylized Depiction in Computer Graphics, Non–Photorealistic, Painterly and 'Toon Rendering," an annotated survey of online resources, 13 pages, last update May 30, 2000, http://www.red.com/cwr/painterly.html.

Render Man Artist Tools, Using Arbitrary Output Variables in Photorealistic Renderman (With Applications), PhotoRealistic Renderman Application Note #24, 8 pages, Jun. 1998, http://www.pixar.com/products/renderman/toolkit/Toolkit/AppNotes/appnote.24.html.

Softimage/3D Full Support, "Toon Assistant," 1998 Avid Technology, Inc., 1 page, http://www.softimage.com/3dsupport/techn . . . uments/3.8/features3.8/rel_notes.56.html.

The RenderMan Interface Version 3.1, (Sep. 1989).

"Renderman Artist Tools, PhotoRealistic RenderMan Tutorial," Pixar (Jan. 1996).

NVIDIA.com, technical presentation, "AGDC Per–Pixel Shading" (Nov. 15, 2000).

NVIDIA.com, technical presentation, Introduction to DX8 Pixel Shaders (Nov. 10, 2000).

NVIDIA.com, technical presentation, "Advanced Pixel Shader Details" (Nov. 10, 2000).

"Developer's Lair, Multitexturing with the ATI Rage Pro," (7 pages) from ati.com web site (2000).

"Hardware Technology," from ATI.com web site, 8 pages (2000).
"Skeletal Animation and Skinning," from ATI.com web site, 2 pages (Summer 2000).
"Developer Relations, ATI Summer 2000 Developer Newsletter," from ATI.com web site, 5 pages (Summer 2000).
Press Releases, "ATI's RADEON family products delivers the most comprehensive support for the advance graphics features of DirectX 8.0," Canada, from ATI.com web site, 2 pages (Nov. 9, 2000).
"ATI RADEON Skinning and Tweening," from ATI.com web site, 1 page (2000).
Hart, Evan et al., "Vertex Shading with Direct3D and OpenGL," Game Developers Conference 2001, from ATI.com web site (2001).
Search Results for: skinning, from ATI.com web site, 5 pages (May 24, 2001).
Hart, Evan et al., "Graphics by rage," Game Developers Conference 2000, from ATI.com web site (2000).
Efficient Command/Data Interface Protocol For Graphics, IBM TDB, vol. 36, issue 9A, Sep. 1, 1993, pp. 307–312.
Shade, Jonathan et al., "Layered Depth Images," Computer Graphics Proceedings, Annual Conference Series, pp. 231–242 (1998).
Videum Conference Pro (PCI) Specification, product of Winnov (Winnov), published Jul. 21, 1999.
Hoppe, Hugues, "Optimization of Mesh Locality for Transparent Vertex Caching," Proceedings of Siggraph, pp. 269–276 (Aug. 8–13, 1999).
Whitepaper: Implementing Fog in Direct3D, Jan. 3, 2000, www.nvidia.com.
Akeley, Kurt, "Reality Engine Graphics", 1993, Silicon Graphics Computer Systems, pp. 109–116.
Photograph of Sony PlayStation II System.
Photograph of Sega Dreamcast System.
Photograph of Nintendo 64 System.
Whitepaper: 3D Graphics Demystified, Nov. 11, 1999, www.nvidia.com.
Whitepaper: "Z Buffering, Interpolation and More W–Buffering", Doug Rogers, Jan. 31, 2000, www.nvidia.com.
Whitepaper: Using GL_NV_vertex_array and GL_NV_fence, posted Aug. 1, 2000, www.nvidia.com.
Whitepaper: Anisotropic Texture Filtering in OpenGL, posted Jul. 17, 2000, www.nvidia.com.
Whitepaper: Mapping Texels to Pixels in D3D, posted Apr. 5, 2000, www.nvidia.com.
Whitepaper: Guard Band Clipping, posted Jan. 31, 2000, www.nvidia.com.
Whitepaper: Cube Environment Mapping, post Jan. 14, 2000, www.nvidia.com.
Whitepaper: Color Key in D3D, posted Jan. 11, 2000, www.nvidia.com.
Whitepaper: Vertex Blending Under DX7 for the GeForce 256, Jan. 5, 2000, www.nvidia.com.
Whitepaper: Optimizing Direct3D for the GeForce 256, Jan. 3, 2000, www.nvidia.com.
Whitepaper: Dot Product Texture Blending, Dec. 3, 1999, www.nvidia.com.
Whitepaper: Technical Brief: AGP 4X with Fast Writes, Nov. 10, 1999, www.nvidia.com.
Technical Brief: Transform and Lightning, Nov. 10, 1999, www.nvidia.com
Technical Brief: What's New With Microsoft DirectX7, posted Nov. 10, 1999, www.nvidia.com.
Mitchell et al., "Multitexturing in DirectX6", Game Developer, Sep. 1998, www.gdmag.com.
VisionTek, "GeForce2 GS Graphics Processing Unit", ©2000 www.visiontek.com.
Jim Bushnell et al. "Advanced Multitexture Effects With Direct3D and OpenGL", Pyramid Peak Design & ATI Research, Inc., GameDevelopers Conference, ©1999.
Sony PlayStation II Instruction Manual, Sony Computer Entertainment Inc., ©2000.
Stand and Be Judged, Next Generation, May 2000.
PlayStation II: Hardware Heaven or Hell?, Next Generation, Jan. 2000.
Chris Charla, "Play Station II: The Latest News", Next Generation, Sep. 1999.
"First PlayStation II Gameplay Screens Revealed?", Next Generation, Sep. 1999.
Game Enthusiast Online Highlights, Mar. 18, 1999.
Game Enthusiast Online Highlights, Mar. 19, 1999.
Game Enthusiast Online Highlights, Mar. 17, 1999.
Game Enthusiast Online Highlights, Oct. 20, 1999.
Joel Easley, "Playstation II Revealed", Game Week, Sep. 29, 1999.
Inside Sony's Next Generation Playstation, ©1999.
Press Releases, Mar. 18, 1999.
Chris Johnston, "PlayStation Part Deux", Press Start, ©1999.
Nikkei Shimbun, "Sony Making SME, Chemical and SPT into Wholly–Owned Subsidaries", Mar. 9, 1999.
AM News: Japanese Developers Not All Sold on PS2, Next Generation, Mar. 16, 1999.
Sony To Turn PlayStation Maker Into Wholly Owned Unit––Nikkei, Dow Jones News Service, Mar. 8, 1999.
Yumiko Ono, Sony Antes Up Its Chips In Bet On New Game System, Dow Jones News Service, Mar. 4, 1999.
MacWeek.Com Gets Inside Story on Connectix VGS for Windows; Controversial Emulator of Sony PlayStation Games Cureently Available for Macs Only, Business Wire, Mar. 12, 1999.
"DexDrive Bridges Gap", The Tampa Tribune, Mar. 12, 1999.
A Microprocessor With a 128b CPU, 10 Floating–Point MAC's, 4 Floating–Point Dividers, and an MPEG2 Decoder, 1999 IEEE International Solid–State Circuits Conference, Feb. 16, 1999.
Dreamcast Instruction Manual, Sega Enterprises, Ltd., ©1998.
"Sega To Launch Video Camera for Dreamcast", Reuters Business News, Feb. 16, 2000.
David Pescovitz, "Dream On", Wired, Aug. 1999.
Randy Nelson, "Dreamcast 101: Everything You Ever Wanted To Know About Sega's Powerful New Console", Official Sega Dreamcast Magazine, Jun. 1999.
2D/3D Graphics Card User Manual, Guillemot ©1999.
Nintendo 64 Instruction Booklet, Nintendo of America, 1998.
Steven Levy, "Here Comes PlayStation II", Newsweek, Mar. 6, 2000.
David Sheff, "Sony Smackage: Test Driving The PlayStation II", Wired, Nov. 1999.
Introducing The Next Generation PlayStation, Sony Computer Entertainment Inc., ©1999.
Leadtek GTS, Aug. 3, 2000, www.hexus.net.

Voodoo 5 5500 Review, Jul. 26, 2000, www.hexus.net.

ATI Radeon 64 Meg DDR OEM, Aug., 19, 2000, www.hexus.net.

Microsoft Xbox—The Future of Gaming, Microsoft Xbox Performance Sheet, www.xbox.com.

Robert L. Cook, "Shade Trees", Computer Graphics, vol. 18, No. 3, Jul. 1984.

Wang et al., "Second–Depth Shadow Mapping", Department of Computer Science, Univ N.C, Chapel Hill, N.C. pp. 1–7.

Peercy et al., "Efficient Bump Mapping Hardware", Computer Graphics Proceedings, Annual Conference Series, 1997.

Gustavo Oliveira, "Refractive Texture Mappig, Part One", www.gamasutra.com, Nov., 10, 2000.

John Schlag, Fast Embossing Effects on Raster Image Data, Graphics Gems IV, Edited by Paul S. Heckbert, Computer Science Department, Carnegie Mellon University, Academic Press, Inc., 1994,pp. 433–437.

James F. Blinn, "Simulationof Wrinkled Surfaces," Caltech/JPL, pp. 286–292, SIGGRAPH 78 (1978).

Tomas Möller and Eric Haines "Real–Time Rendering", AK Peters, Ltd., ® 1999, pp. 127–142.

Technical Presentation: Vertex Buffers, posted Jun. 12, 2000, www.nvidia.com.

Technical Presentation: Hardware Transform and Lightning, www.nvidia.com, posted Jun. 12, 2000.

Technical Presentation: Hardware Bump–mapping Choices and Concepts, Jun. 7, 2000, www.nvidia.com.

Technical Presentation: How to Bump Map a Skinned Polygonal Model, Jun. 7, 2000, www.nvidia.com.

Technical Presentation: Computations for Hardware Lighting and Shading, Mar. 17, 2000, www.nvidia.com.

Technical Presentation: Practical Bump–mapping for Today's GPUs, Mar. 17, 2000 www.nvidia.com.

Technical Presentation: Shadows, Transparency, & Fog, Mar. 17, 2000 www.nvidia.com.

Technical Presentation: GeForce 256 Register Combiners, Mar. 17, 2000,www.nvidia.com.

Technical Presentation: TexGen & The Texture Matrix, Mar. 15, 2000 www.nvidia.com.

Technical Presentation: Toon Shading, Mar. 15, 2000, www.nvidia.com.

Technical Presentation: D3D 7 Vertex Lighting, Mar. 15, 2000, www.nvidia.com.

Technical Presentation: Per–Pixel Lighting (by S. Dietrich) Mar. 14, 2000 www.nvidia.com.

Technical Presentation: GeForce 256 and RIVA TNT Combiners, Dec. 8, 1999, www.nvidia.com.

Technical Presentation: Vertex Cache Optimization, Nov. 12, 1999, www.nvidia.com.

Technical Presentation: Vertex Blending, Nov. 12, 1999, www.nvidia.com.

Technical Presentation: Hardware Transform and Lighting, Nov. 12, 1999, www.nvidia.com.

Technical Presentation: GeForce 256 Overview, Nov. 12, 1999, www.nvidia.com.

Technical Presentation: DirectX 7 and Texture Management, Nov. 12, 1999 www.nvidia.com.

Technical Presentation: Dot Product Lighting, Nov. 12, 1999, www.nvidia.com.

Technical Presentation: Texture Coordinate Generation, Nov. 3, 1999, www.nvidia.com.

Technical Presentation: Phong Shading and Lightmaps, Nov. 3, 1999, www.nvidia.com.

Technical Presentation: The ARB_multitexture Extension, Nov. 3, 1999 www.nvidia.com.

Technical Presentation: Multitexture Combiners, Nov. 3, 1999, www.nvidia.com.

Technical Presentation: Emboss Bump Mapping, Nov. 3, 1999, www.nvidia.com.

Technical Presentation: Hardware Accelerated Anisotropic Lighting, Nov. 3, 1999, www.nvidia.com.

Technical Presentation: Guard Band Clipping, Nov. 3, 1999, www.nvidia.com.

The RenderMan Interface, Stephan R. Keith, Version 3.1, Pixar Animation Studios, Sep. 1989.

The RenderMan Interface, Version 3.2, Pixar Animation Studios, Jul. 2000, www.pixar.com.

NVIDIA Product Overview, "GeForce2Ultra", NVIDIA Corporation, Aug. 21, 2000, www.nvidia.com.

Duke, "Dreamcast Technical Specs", Sega Dreamcast Review, Sega, 2/99, www.game–revolution.com.

Marlin Rowley, "GeForce 1 & 2 GPU Speed Tests", May 11, 2000, www.g256.com.

"Dreamcast: The Full Story", Next Generation, Sep. 1998.

DirectX 7.0 Programmer's Reference, Microsoft Corporation, 1995–1999 (as part of the DirectX 7.0 SDK on the Companion CD included with "Inside Direct3D", Microsoft Programming Series, Peter J. Kovach, Microsoft Press, 1999).

"Inside Direct3D", Microsoft Programming Series, Peter J. Kovach, Microsoft Press, 1999.

"OpenGL Programming Guide, The Official Guide to Learning OpenGL, Release 1", Jackie Nieder, Tom David, Mason Woo, Addision–Wesley Publishing Co., 1993.

"Procedural Elements for Computer Graphics," Second Edition, David F. Rogers, McGraw Hill,1998.

"Real–Time Rendering," Tomas Molleir, Eric Haines, AK Peters, 1999.

"Computer Graphics, Principles and Practice," Second Edition, The Systems Programming Series, Foley, van Dam, Fiener, Hughes, Addison Wesley, 1990.

"Principles of Three–Dimensional Computer Animation", Revised Edition, Michael O'Rourke, W.W. Norton & Company, 1998.

* cited by examiner

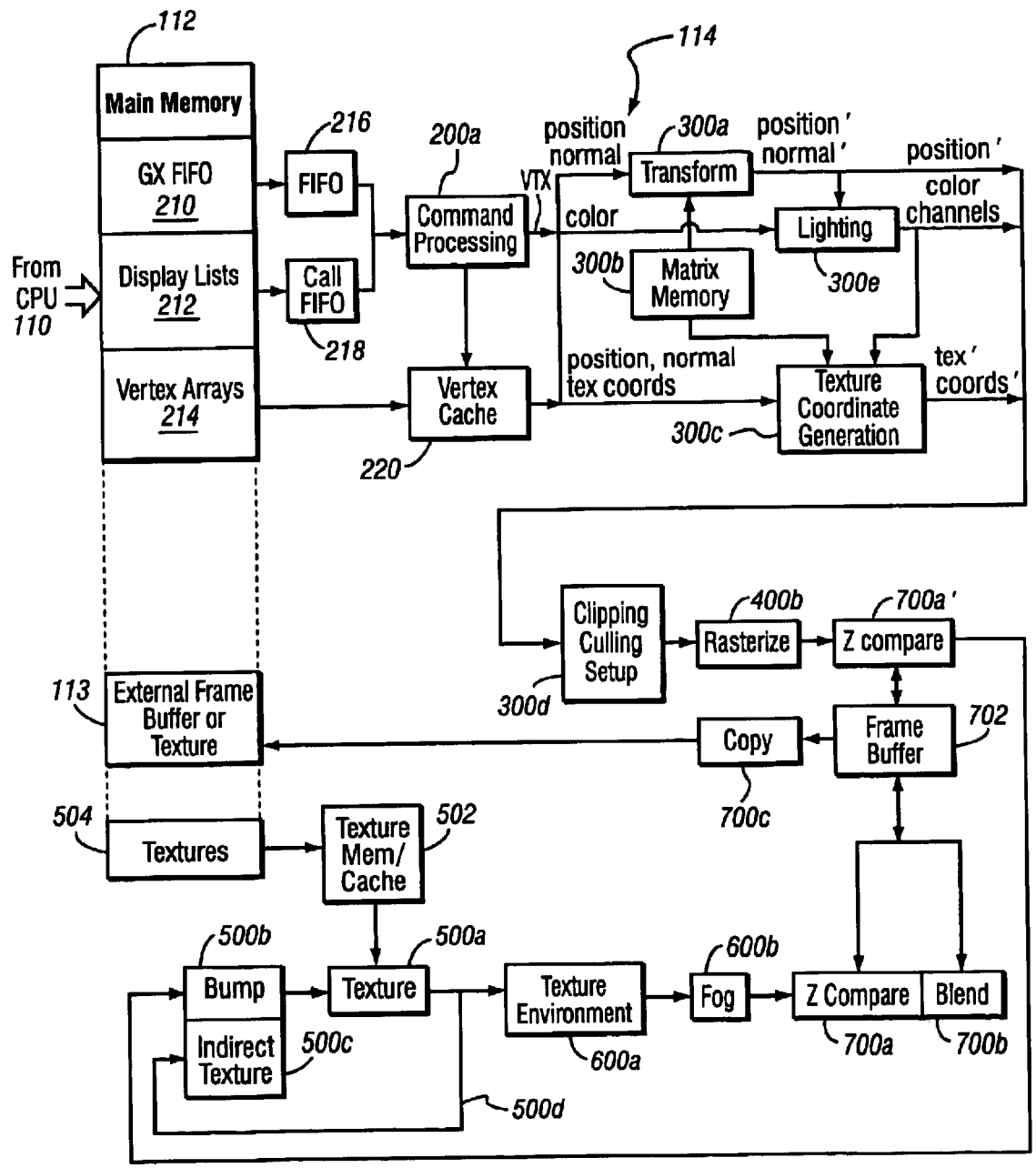
Fig. 5 EXAMPLE GRAPHICS PROCESSOR FLOW

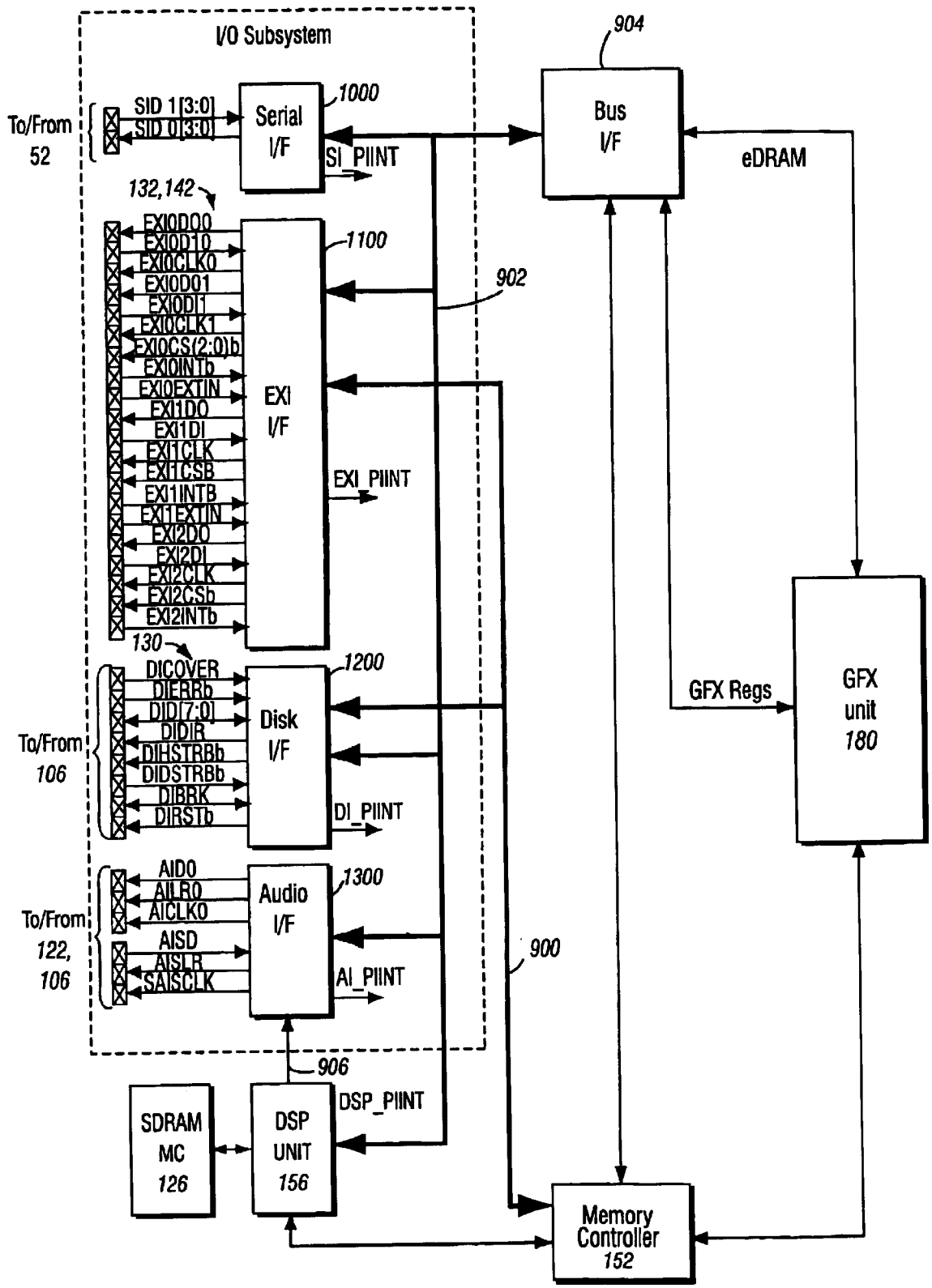
Fig. 6 EXAMPLE INPUT/OUTPUT SUBSYSTEM

EXAMPLE SERIAL INTERFACE

EXAMPLE SERIAL INTERFACE

| Register | Offset(hex) |
|---|---|
| 31　　　　　　　　　16 15　　　　　　　　　0 | |
| SI Channel 0 Output Buffer (SIC0OUTBUF) | 0x00 |
| SI Channel 0 Input Buffer H (SIC0INBUFH) | 0x04 |
| SI Channel 0 Input Buffer L (SIC0INBUFL) | 0x08 |
| SI Channel 1 Output Buffer (SIC1OUTBUF) | 0x0C |
| SI Channel 1 Input Buffer H (SIC1INBUFH) | 0x10 |
| SI Channel 1 Input Buffer L (SIC1INBUFL) | 0x14 |
| SI Channel 2 Output Buffer (SIC2OUTBUF) | 0x18 |
| SI Channel 2 Input Buffer H (SIC2INBUFH) | 0x1C |
| SI Channel 2 Input Buffer L (SIC2INBUFL) | 0x20 |
| SI Channel 3 Output Buffer (SIC3OUTBUF) | 0x24 |
| SI Channel 3 Input Buffer H (SIC3INBUFH) | 0x28 |
| SI Channel 3 Input Buffer L (SIC3INBUFL) | 0x2C |
| SI Poll Control Register (SIPOLL) | 0x30 |
| SI Communication Control Status Register (SICOMCSR) | 0x34 |
| SI Status Register (SISR) | 0x38 |
| SI EXI Lock Register (SIEXILK) | 0x3C |
| SI Communication RAM (128 Bytes) | 0x80-0xFF |

Fig. 7C
EXAMPLE SERIAL INTERFACE REGISTERS

EXAMPLE SERIAL INTERFACE

Command Frame

Response Frame

CONTROLLER INTERFACE FOR A GRAPHICS SYSTEM

RELATED APPLICATIONS

This application claims priority from provisional Application No. 60/226,885, filed Aug. 23, 2000, the contents of which are incorporated herein.

FIELD OF THE INVENTION

The present invention relates to computer graphics, and more particularly to interactive graphics systems such as home video game platforms. Still more particularly this invention relates to a controller interface used to connect a controller to a graphics system.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of a performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

In an interactive real time system such as a gaming platform, user-manipulable controls are provided for player inputs. The controls may take many forms including buttons, switches, joysticks, trackballs and the like. These player inputs are used during game play, for example, to move characters left, right, up and down; to take character actions such as jumping; etc. Thus, in game systems, some means must be provided to interface with user-manipulable controls such as hand-held controllers or the like. The present invention provides such an interface. More specifically, the present invention provides an interface for interfacing an audio and graphics coprocessor with a variety of different types of accessory devices including but not limited to hand-held game controllers. The serial interface provides a single bit serial interface using a state-based interface protocol. The interface supports four separate serial interfaces to four hand-held controllers or associated devices. Each interface can be accessed in parallel. In a controller mode, the last state of the controller is stored in a double-buffered register to support simple main processor reads for determining state. The example embodiment automatically polls controller state using hardware circuitry with configurable polling periods. A bulk mode supports changeable data size. A pair of light gun signals can be used to control separate horizontal/vertical counters to support flash and shutter light guns. An LCD shutter can be supported through automatic polling and a serial control command. The system interface includes automatic control of presence detect to save effort on the part of the main processor.

In accordance with one particular aspect of the present invention, a video game system includes a game program executing system executing a game program and one or more controllers supplying user inputs to the game program executing system. An interface between the controllers and the game program executing system is programmable to periodically poll the controller without involvement of the game program executing system.

BRIEF DESCRIPTION OF THE DRAWINGS

These and other features and advantages provided by the invention will be better and more completely understood by referring to the following detailed description of presently preferred embodiments in conjunction with the drawings, of which:

FIG. 5 is an example logical flow diagram of the FIG. 4 graphics and audio processor;

FIG. 6 shows an example input/output subsystem;

FIG. 7C shows example serial interface registers;

DETAILED DESCRIPTION OF EXAMPLE EMBODIMENTS OF THE INVENTION

Figure 1:
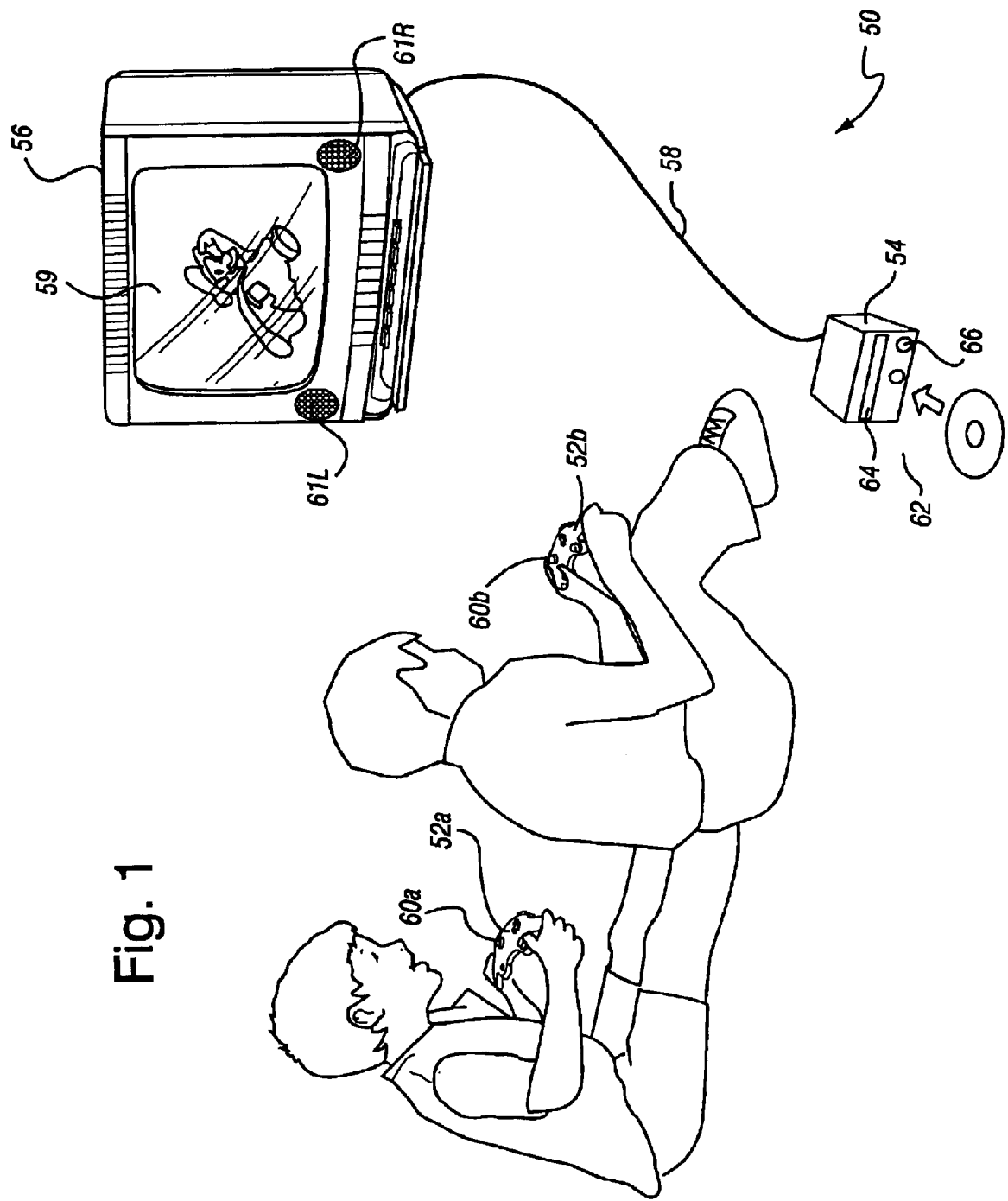
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52a to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
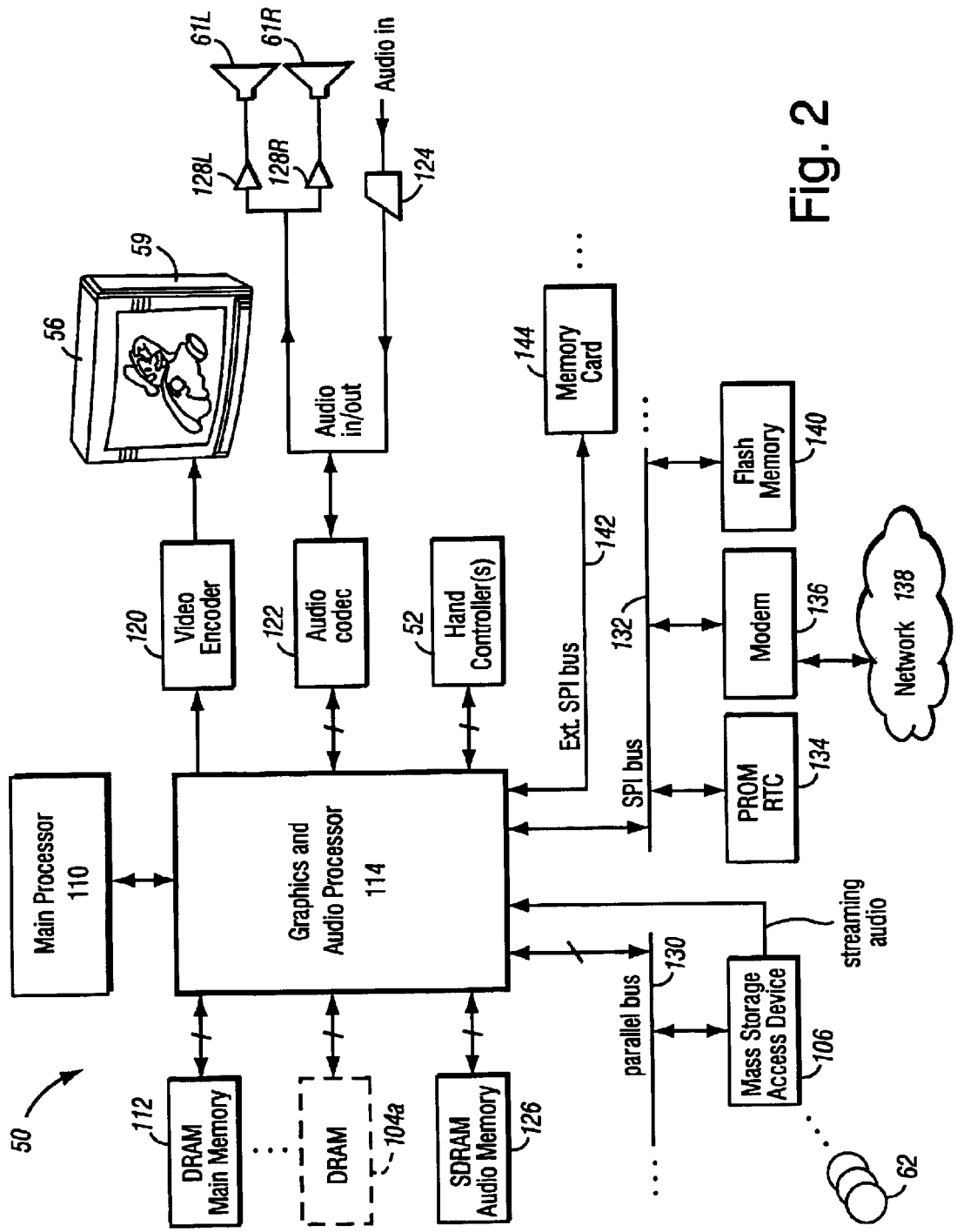
FIG. 2 is a block diagram of the FIG. 1 example computer graphics system.

FIG. 2 shows a block diagram of example components of system 50. The primary components include:

a main processor (CPU) 110, a main memory 112, and a graphics and audio processor 114.

In this example, main processor 110 (e.g., an enhanced IBM Power PC 750) receives inputs from handheld controllers 52 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:

a programmable read-only memory (PROM) and/or real time clock (RTC) 134, a modem 136 or other networking interface (which may in turn connect system 50 to a telecommunications network 138 such as the Internet or other digital network from/to which program instructions and/or data can be downloaded or uploaded), and a flash memory 140.

A further external serial bus 142 may be used to communicate with additional expansion memory 144 (e.g., a memory card) or other devices. Connectors may be used to connect various devices to busses 130, 132, 142.

Example Graphics and Audio Processor

Figure 3:
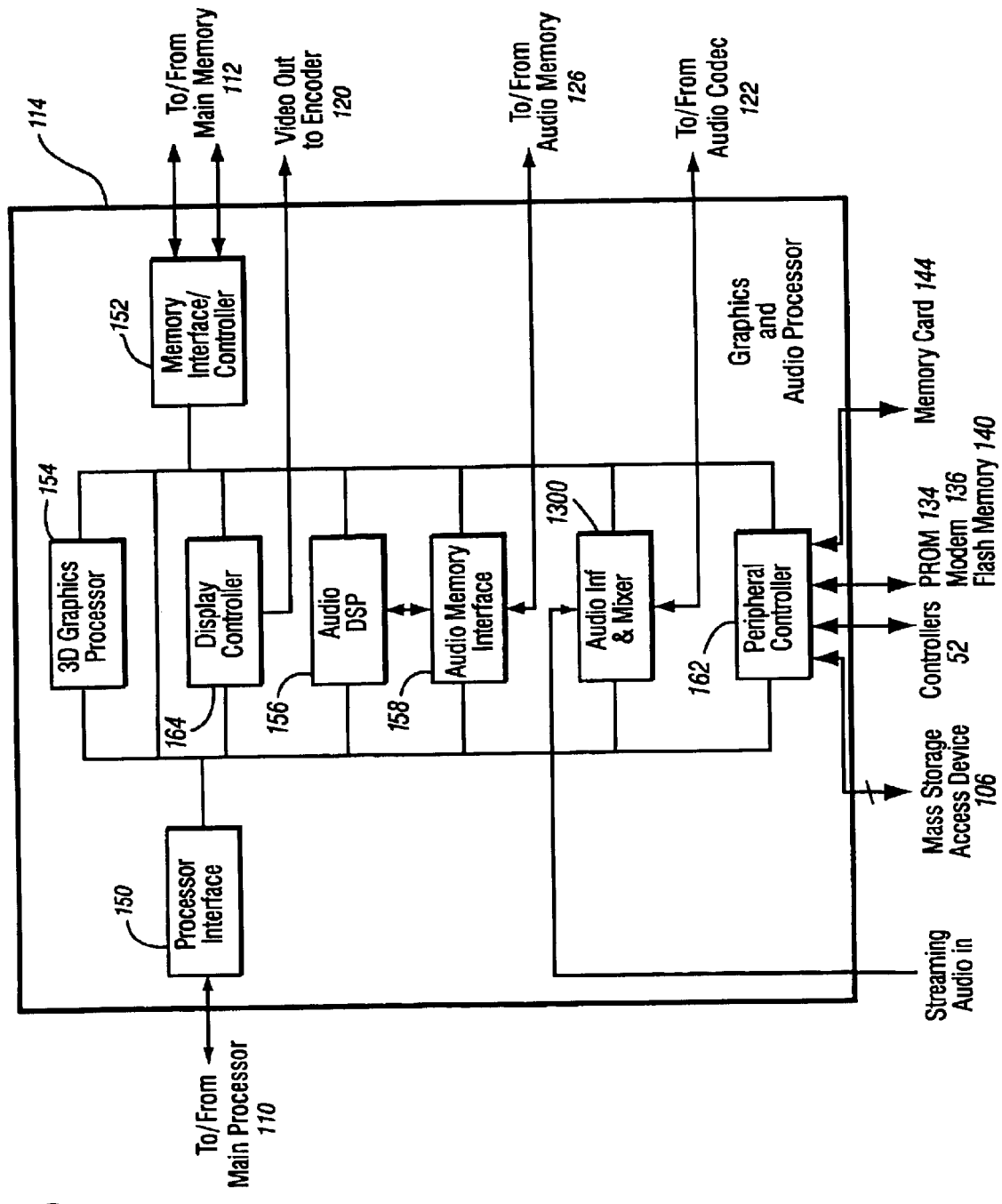
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:

a processor interface 150, a memory interface/controller 152, a 3D graphics processor 154, an audio digital signal processor (DSP) 156, an audio memory interface 158, an audio interface and mixer 1300, a peripheral controller 162, and a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 1300 interfaces with audio codec 122, and can also mix audio from different sources (e.g., streaming audio from mass access storage device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
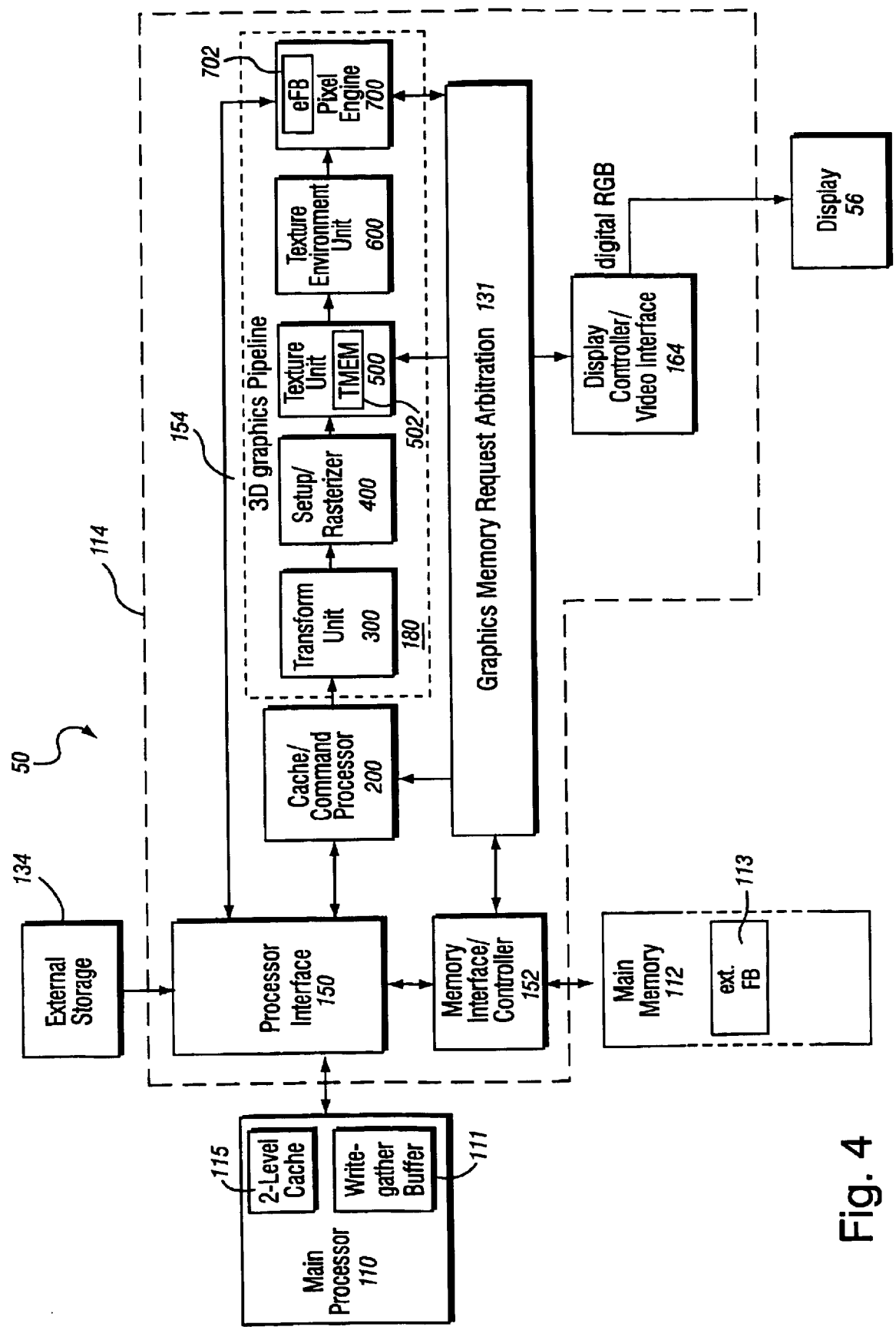
FIG. 4 is a block diagram of the example 3D graphics processor shown in FIG. 3.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 112. The command processor 200 fetches:

command streams from main memory 112 via an on-chip FIFO memory buffer 216 that receives and buffers the graphics commands for synchronization/flow control and load balancing, display lists 212 from main memory 112 via an on-chip call FIFO memory buffer 218, and vertex attributes from the command stream and/or from vertex arrays 214 in main memory 112 via a vertex cache 220.

Command processor 200 performs command processing operations 200*a* that convert attribute types to floating point format, and pass the resulting complete vertex polygon data to graphics pipeline 180 for rendering/rasterization. A programmable memory arbitration circuitry 131 (see FIG. 4) arbitrates access to shared main memory 112 between graphics pipeline 180, command processor 200 and display controller/video interface unit 164.

FIG. 4 shows that graphics pipeline 180 may include:

a transform unit 300, a setup/rasterizer 400, a texture unit 500, a texture environment unit 600, and a pixel engine 700.

Transform unit 300 performs a variety of 2D and 3D transform and other operations 300*a* (see FIG. 5). Transform unit 300 may include one or more matrix memories 300*b* for storing matrices used in transformation processing 300*a*. Transform unit 300 transforms incoming geometry per vertex from object space to screen space; and transforms incoming texture coordinates and computes projective texture coordinates (300*c*). Transform unit 300 may also perform polygon clipping/culling 300*d*. Lighting processing 300*e* also performed by transform unit 300 provides per vertex lighting computations for up to eight independent lights in one example embodiment. Transform unit 300 can also perform texture coordinate generation (300*c*) for embossed type bump mapping effects, as well as polygon clipping/culling operations (300*d*).

Setup/rasterizer 400 includes a setup unit which receives vertex data from transform unit 300 and sends triangle setup information to one or more rasterizer units (400*b*) performing edge rasterization, texture coordinate rasterization and color rasterization.

Texture unit 500 (which may include an on-chip texture memory (TMEM) 502) performs various tasks related to texturing including for example:

retrieving textures 504 from main memory 112, texture processing (500*a*) including, for example, multi-texture handling, post-cache texture decompression, texture filtering, embossing, shadows and lighting through the use of projective textures, and BLIT with alpha transparency and depth, bump map processing for computing texture coordinate displacements for bump mapping, pseudo texture and texture tiling effects (500*b*), and indirect texture processing (500*c*).

Texture unit 500 outputs filtered texture values to the texture environment unit 600 for texture environment processing (600*a*). Texture environment unit 600 blends polygon and texture color/alpha/depth, and can also perform texture fog processing (600*b*) to achieve inverse range based fog effects. Texture environment unit 600 can provide multiple stages to perform a variety of other interesting environment-related functions based for example on color/alpha modulation, embossing, detail texturing, texture swapping, clamping, and depth blending.

Pixel engine 700 performs depth (z) compare (700*a*) and pixel blending (700*b*). In this example, pixel engine 700 stores data into an embedded (on-chip) frame buffer memory 702. Graphics pipeline 180 may include one or more embedded DRAM memories 702 to store frame buffer and/or texture information locally. Z compares 700*a'* can also be performed at an earlier stage in the graphics pipeline 180 depending on the rendering mode currently in effect (e.g., z compares can be performed earlier if alpha blending is not required). The pixel engine 700 includes a copy operation 700c that periodically writes on-chip frame buffer 702 to memory portion 113 of main memory 112 for access by display/video interface unit 164. This copy operation 700c can also be used to copy embedded frame buffer 702 contents to textures in the main memory 112 for dynamic texture synthesis effects. Anti-aliasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 56.

Example Input/Output Subsystem

FIG. 6 shows an example input/output subsystem. In this example, the input/output subsystem includes a serial interface 1000, an external interface 1100, a disk interface 1200 and an audio interface 1300. Serial interface 1000 is used to communicate with controllers 52 or other devices that can be coupled to one of four serial ports of system 50. External interface 1100 is used to communicate with a variety of devices such as PROM RTC 134, modem 136, flash memory 140, memory card 144, etc. via various buses 132, 142. Disk interface 1200 is used to communicate with mass storage access device 106 via a parallel bus 130. Audio interface 1300 is used to stream the audio output data from an audio buffer in main memory 112 to audio codec 122.

In the example embodiment, the external interface 1100 and disk interface 1200 have direct access to memory controller 152 via a bus 900. Details of the operation of memory controller 152 may be found in provisional Application No. 60/226,894, filed Aug. 23, 2000 and its corresponding utility application Ser. No. 09/726,220, filed Nov. 28, 2000, both entitled "Graphics Processing System with Enhanced Memory Controller" and provisional Application No. 60/226,886, filed Aug. 23, 2000 and its corresponding utility application Ser. No. 09/722,665, filed Nov. 28, 2000, both entitled "Method and Apparatus for Accessing Shared Resources." The contents of each of these applications are incorporated herein by reference. In addition, each one of interfaces 1000, 1100, 1200 and 1300 as well as audio digital signal processor 156 share a common bus 902 used to communicate between these components and a bus interface 904. The bus interface 904, in turn, can be used to arbitrate access to graphics unit 180. In the example embodiment, there is also a connection 906 between DSP 156 and audio interface 1300.

Briefly, disk interface 1200 provides an interface to mass storage access device 106 providing a direct memory access (DMA) capability with interrupt. Serial interface 1000 provides a serial interface to hand controllers 52 or other serial devices using automatic controller polling and bulk data mode. The serial interface also includes a light gun interface. The external interface 1100 provides multiple SBI buses as well as a memory-mapped area for boot PROM 134. Audio interface 1300 provides an output to audio codec 122 as well as an input for streaming audio from mass storage access device 106.

Example Serial Interface

Figure 7A:
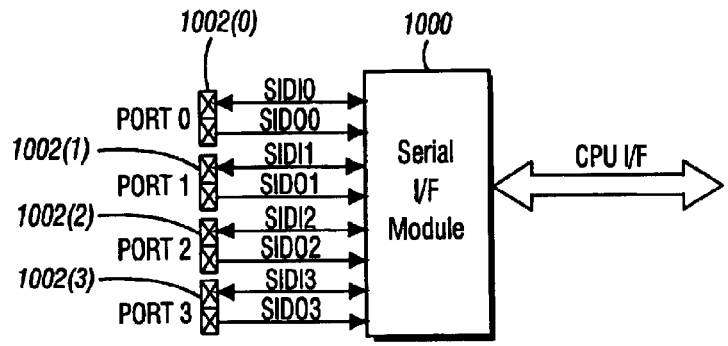
FIGS. 7A and 7B show an example serial interface.
Figure 7B:
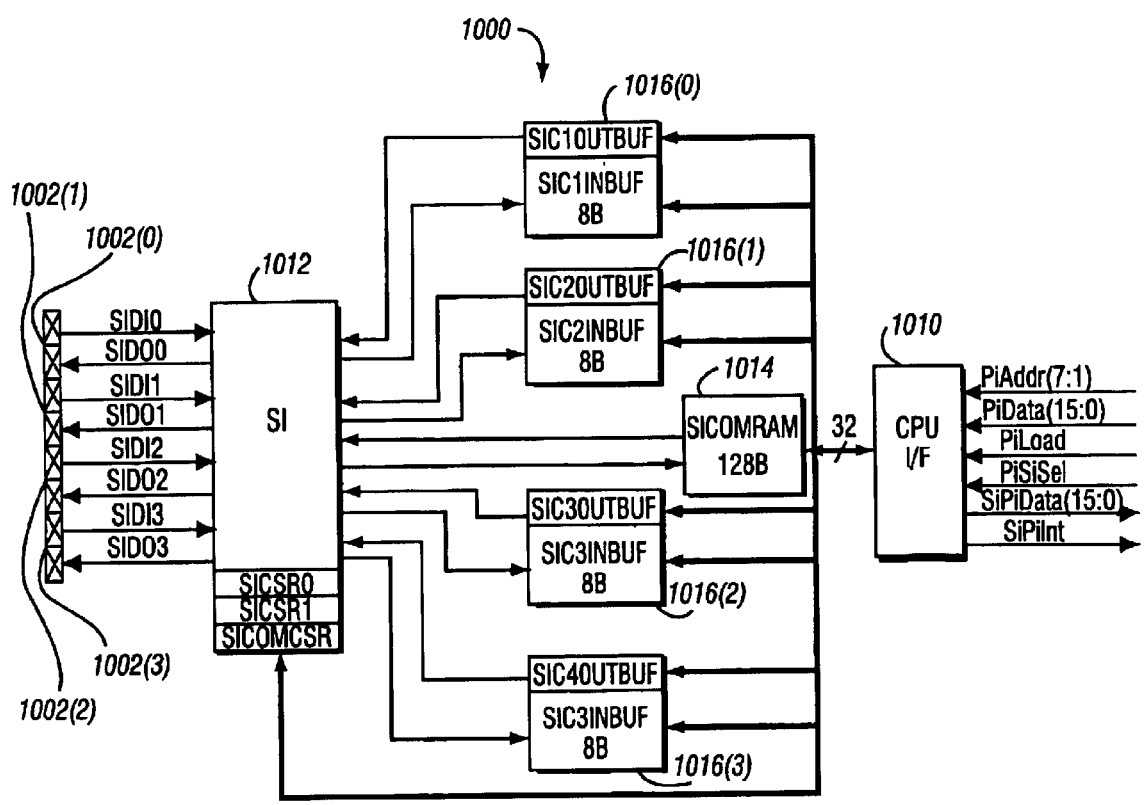

FIGS. 7A and 7B show an example serial interface 1000. In this particular example, serial interface 1000 is a single bit serial interface that runs at 250 kHz. This single bit serial interface is similar to the controller interface used in the prior art Nintendo 64® product manufactured by Nintendo, but there are some differences. Example serial interface 1000 provides the following features in the example embodiment:

four separate 250 kHz serial interfaces for four controllers 52, each interface can be accessed in parallel, in controller mode, the last state of the controller 52 is in a double-buffered processor input/output register so that main processor 110 can simply read the register to determine the controller state, the controller state is automatically polled by hardware with configurable polling periods, bulk mode (changeable data size), two light gun signals are used to control two separate horizontal/vertical counters to support both flash and shutter light guns, an LCD shutter is supported through automatic polling and serial control commands, and the serial interface 1000 can automatically detect the presence of hand controllers 52.

FIG. 7A shows the external interface of serial interface 1000. In this example, there are four separate controller ports 1002 on system 50. Each port 1002 has a pair of input and output pins (shown by the "x" mark blocks in FIG. 7A). The input pin connects directly to an external game controller 52 in the example embodiment. The output pin in the example embodiment connects to an external open-drain driver (see FIG. 9) which in turn connects directly to the external game controller 52. In the example embodiment, two of the ports 1002 have horizontal/vertical latch signals that can be used to latch horizontal/vertical counters within the video interface 164. These signals combined with the functionality of serial interface 1000 provide support for flash and shutter type light guns. The vertical latch and control registers used for this functionality are located in the video interface 164 in the example embodiment. FIG. 7A shows each of the four serial ports 1002 including an SIDI (bi-directional) line and an SIDO (uni-directional) controller output-to-serial interface line. The following shows example descriptions of these two signals:

| Name | Dir | Type | Description |
| --- | --- | --- | --- |
| SIDI[3:0] | I | LVCMOS | Serial Interface Data Input: SIDI[3:0] are input signals, each bit is a separate half-duplex, 250kbit/s input serial channel. The serial protocol is an asynchronous interface and is self timed, using a pulse width modulated signaling scheme. |
| SID0[3:0] | O | LVCMOS | Serial Interface Data Output: SIDO[3:0] are output signals, each bit is a separate half-duplex, 250kbit/s output serial channel. The serial protocol is an asynchronous interface and, is self timed, using a pulse width modulated signaling scheme. |

FIG. 7B is a more detailed block diagram of serial interface 1000. As shown in this Figure, serial interface 1000 includes a main processor interface 1010, serial interface communication circuitry and registers 1012, a small (128 byte) communication RAM 1014, and an input/output buffer arrangement 1016 for each of the four serial ports 1002.

FIG. 7C shows an example set of registers (register map) used to control serial interface 1000 in the example embodiment. The base address for these serial interface registers in the example embodiment is 0x0C006400. The following describes each of these various example registers in the example embodiment:

SIC0OUTBUF SI Channel 0 Output Buffer
Mnemonic: SIC0OUTBUF
Offset: 0x00
Size: 32 bits
SIC0OUTBUF

| Bits | Mnemonic | Type | Reset | Description |
|---|---|---|---|---|
| 31 ... 24 | | R | 0x0 | Reserved |
| 23 ... 16 | CMD | RW | 0x0 | Command: This byte is the opcode for the command sent to the controller during each command/response packet. This is the first data byte sent from the SI I/F to the game controller in the command/response packet. |
| 15 ... 8 | OUTPUT0 | RW | 0x0 | Output Byte 0: This is the first data byte of the command packet. It is the second data byte sent from the SI I/F to the game controller in the command/response packet. |
| 7 ... 0 | OUTPUT1 | RW | 0x0 | Output Byte 1: This is the second data byte of the command packet. It is the third data byte sent from the SI I/F to the game controller in the command/response packet. |

This register is double buffered, so main processor writes to the SIC0OUTBUF will not interfere with the serial interface output transfer. Internally, a second buffer is used to hold the output data to be transferred across the serial interface. To check if SIC0OUTBUF has been transferred to the second buffer, main processor 110 polls the SISR [WRST0] register. When SIC0OUTBUF is transferred, SISR[WRST0] is cleared.

SIC0INBUF SI Channel 0 Input Buffer High
Mnemonic: SIC0INBUFH
Offset: 0x04
Size: 32 bits
SIC0INBUFH

| Bits | Mnemonic | Type | Reset | Description |
|---|---|---|---|---|
| 31 | ERRSTAT | R | 0x0 | Error Status: This bit represents the current error status for the last SI polling transfer on channel 0. This register is updated after each polling transfer on this channel.<br>0 = No error on last transfer<br>1 = Error on last transfer |
| 30 | ERRLATCH | R | 0x0 | Error Latch: This bit is an error status summary of the SISR error bits for this channel. If an error has occurred on a past SI transfer on channel 0 (polling or Com transfer), this bit will be set. To determine the exact error, read the SISR register. This bit is actually an 'or' of the latched error status bits for channel 0 in the SISR. The bit is cleared by clearing the appropriate error status bits latched in the SISR. The no response error indicates that a controller is not present on this channel.<br>0 = No errors latched<br>1 = Error latched. Check SISR. |
| 29 ... 24 | INPUT0 | R | 0x0 | Input Byte 0: This is the first data byte of the response packet sent from the game controller to the SI I/F for channel 0. The top two bits of the byte returning from the controller are assumed to be '0', so they are not included. |
| 23 ... 16 | INPUT1 | R | 0x0 | Input Byte 1: This is the second data byte of the response packet sent from the game controller to the SI I/F for channel 0. |

| | | | | -continued | |
|---|---|---|---|---|---|
| SIC0INBUF SI Channel 0 Input Buffer High | | | | | |
| | | Mnemonic: | | SIC0INBUFH | |
| | | Offset: | | 0x04 | |
| | | Size | | 32 bits | |
| | | | | SIC0INBUFH | |
| Bits | Mnemonic | Type | Reset | Description | |
| 15 ... 8 | INPUT2 | R | 0x0 | Input Byte 2: This is the third data byte of the response packet sent from the game controllers to the SI I/F for channel 0. | |
| 7:0 | INPUT3 | R | 0x0 | Input Byte 3: This is the fourth data byte of the response packet sent from the game controller to the SI I/F for channel 0. | |

SIC0INBUFH and SIC0INBUFL are double buffered to prevent inconsistent data reads due to the main processor 110 conflicting with incoming serial interface data. To insure data read from SIC0INBUFH and SIC0INFUBL are consistent, a locking mechanism prevents the double buffer from copying new data to these registers. Once SIC0INBUFH is read, both SIC0INBUFH and SIC0INBUFL are 'locked' until SIC0INBUFL is read. While the buffers are 'locked', new data is not copied into the buffers. When SIC0INBUFL is read, the buffers become unlocked again.

| | | | | |
|---|---|---|---|---|
| SIC0INBUF SI Channel 0 Input Buffer Low | | | | |
| | Mnemonic: | | SIC0INBUFL | |
| | Offset: | | 0x08 | |
| | Size | | 32 bits | |
| | | | SIC0INBUFL | |
| Bits | Mnemonic | Type | Reset | Description |
| 31 ... 24 | INPUT4 | R | 0x0 | Input Byte 4: See Description of SIC1INBUFH[INPUT1]. |
| 23 ... 16 | INPUT5 | R | 0x0 | Input Byte 5: See Description of SIC1INBUFH[INPUT1]. |
| 15 ... 8 | INPUT6 | R | 0x0 | Input Byte 6: See Description of SIC1INBUFH[INPUT1]. |
| 7 ... 0 | INPUT7 | R | 0x0 | Input Byte 7: See Description of SIC1INBUFH[INPUT1]. |
| SIC1OUTBUF SI Channel 1 Output Buffer | | | | |
| | Mnemonic: | | SIC1OUTBUF | |
| | Offset: | | 0x0C | |
| | Size | | 32 bits | |
| | | | SIC1OUTBUF | |
| Bits | Mnemonic | Type | Reset | Description |
| 31 ... 24 | | R | 0x0 | Reserved |
| 23 ... 16 | CMD | RW | 0x0 | Command: For SI channel 1. See SIC0OUTBUFF[CMD] description. |
| 15 ... 8 | OUTPUT0 | RW | 0x0 | OutputByte 0: For SI channel 1. See SIC0OUTBUFF[OUTPUT0] description. |
| 7 ... 0 | OUTPUT1 | RW | 0x0 | Output Byte 1: For SI channel 1. See SIC0OUTBUFF[OUTPUT1] description. |
| SIC1INBUF SI Channel 1 Input Buffer High | | | | |
| | Mnemonic: | | SIC1INBUFH | |
| | Offset: | | 0x10 | |
| | Size | | 32 bits | |
| | | | SIC1INBUFH | |
| Bits | Mnemonic | Type | Reset | Description |
| 31 | ERRSTAT | R | 0x0 | Error Status: See Description of SIC0INBUFH[ERRSTAT]. |
| 30 | ERRLATCH | R | 0x0 | Error Latch: See Description of SIC0INBUFH[ERRLATCH]. |
| 29 ... 24 | INPUT0 | R | 0x0 | Input Byte 0: See Description of SIC0INBUFH[INPUT0]. |
| 23 ... 16 | INPUT1 | R | 0x0 | Input Byte 1: See Description of SIC0INBUFH[INPUT1]. |
| 15 ... 8 | INPUT2 | R | 0x0 | Input Byte 2: See Description of SIC0INBUFH[INPUT1]. |

| Bits | Mnemonic | Type | Reset | Description |
|---|---|---|---|---|
| 7 . . . 0 | INPUT3 | R | 0x0 | Input Byte 3: See Description of SIC0INBUFH[INPUT1]. |

SIC1INBUF SI Channel 1 Input Buffer Low
Mnemomc: SIC1INBUFL
Offset: 0x14
Size: 32 bits
SIC1INBUFL

| Bits | Mnemonic | Type | Reset | Description |
|---|---|---|---|---|
| 31 . . . 24 | INPUT4 | R | 0x0 | Input Byte 4: See Description of SIC0INBUFH[INPUT1]. |
| 23 . . . 16 | INPUT5 | R | 0x0 | Input Byte 5: See Description of SIC0INBUFH[INPUT1]. |
| 15 . . . 8 | INPUT6 | R | 0x0 | Input Byte 6: See Description of SIC0INBUFH[INPUT1]. |
| 7 . . . 0 | INPUT7 | R | 0x0 | Input Byte 7: See Description of SIC0INBUFH[INPUT1]. |

SIC2OUTBUF SI Channel 2 Output Buffer
Mnemonic: SIC2OBUF
Offset: 0x18
Size: 32 bits
SIC2OUTBUF

| Bits | Mnemonic | Type | Reset | Description |
|---|---|---|---|---|
| 31 . . . 24 | | R | 0x0 | Reserved |
| 23 . . . 16 | CMD | RW | 0x0 | Command: For SI Channel 2. See SIC0OUTBUFF[CMD] description |
| 15 . . . 8 | OUTPUT0 | RW | 0x0 | Output Byte 0: For SI channel 2. See SIC0OUTBUFF[OUTPUT0] description. |
| 7 . . . 0 | OUTPUT1 | RW | 0x0 | Output Byte 1: For SI channel 2. See SIC0OUTBUFF[OUTPUT1] description. |

SIC2INBUF SI Channel 2 Input Buffer High
Mnemonic: SIC2INBUFH
Offset: 0x1C
Size: 32 bits
SIC2INBUFH

| Bits | Mnemonic | Type | Reset | Description |
|---|---|---|---|---|
| 31 | ERRSTAT | R | 0x0 | Error Status: See Description of SIC0INBUFH[ERRSTAT]. |
| 30 | ERRLATCH | R | 0x0 | Error Latch: See Description of SIC0INBUFH[ERRLATCH]. |
| 29 . . . 24 | INPUT0 | R | 0x0 | Input Byte 0: See Description of SIC0INBUFH[INPUT1]. |
| 23 . . . 16 | INPUT1 | R | 0x0 | Input Byte 1: See Description of SIC0INBUFH[INPUT0]. |
| 15 . . . 8 | INPUT2 | R | 0x0 | Input Byte 2: See Description of SIC0INBUFH[INPUT1]. |
| 7 . . . 0 | INPUT3 | R | 0x0 | Input Byte 3: See Description of SIC0INBUFH[INPUT1]. |

SIC2INBUF SI Channel 2 Input Buffer Low
Mnemonic: SIC2INBUFL
Offset: 0x20
Size: 32 bits
SIC2INBUFL

| Bits | Mnemonic | Type | Reset | Description |
|---|---|---|---|---|
| 31 . . . 24 | INPUT4 | R | 0x0 | Input Byte 4: See Description of SIC0INBUFH[INPUT0]. |
| 23 . . . 16 | INPUT5 | R | 0x0 | Input Byte 5: See Description of SIC0INBUFH[INPUT0]. |
| 15 . . . 8 | INPUT6 | R | 0x0 | Input Byte 6: See Description of SIC0INBUFH[INPUT0]. |
| 7 . . . 0 | INPUT7 | R | 0x0 | Input Byte 7: See Description of SIC0INBUFH[INPUT0]. |

SIC3OUTBUF SI Channel 3 Output Buffer
Mnemonic: SIC3OBUF
Offset: 0x24

-continued

| | | Size | | 32 bits |
| --- | --- | --- | --- | --- |
| | | | | SIC3OUTBUF |

| Bits | Mnemonic | Type | Reset | Description |
| --- | --- | --- | --- | --- |
| 31 . . . 24 | | R | 0x0 | Reserved |
| 23 . . . 16 | CMD | RW | 0x0 | Command: For SI channel 3. See SIC0OUTBUFF[CMD] description |
| 15 . . . 8 | OUTPUT0 | RW | 0x0 | Output Byte 0: For SI channel 3. See SIC0OUTBUFF[OUTPUT0] description |
| 7 . . . 0 | OUTPUT1 | RW | 0x0 | Output Byte 1: For SI channel 3. See SIC0OUTBUFF[OUTPUT1] description |

| | | SIC3INBUF SI Channel 3 Input Buffer High | | |
| --- | --- | --- | --- | --- |
| | | Mnemonic: | SIC3INBUFH | |
| | | Offset: | 0x28 | |
| | | Size | 32 bits | |
| | | | SIC3INBUFH | |

| Bits | Mnemonic | Type | Reset | Description |
| --- | --- | --- | --- | --- |
| 31 | ERRSTAT | R | 0x0 | Error Status: See Description of SIC0INBUFH[ERRSTAT]. |
| 30 | ERRLATCH | R | 0x0 | Error Latch: See Description of SIC0INBUFH[ERRLATCH]. |
| 29 . . . 24 | INPUT0 | R | 0x0 | Input Byte 0: See Description of SIC0INBUFH[INPUT0]. |
| 23 . . . 16 | INPUT1 | R | 0x0 | Input Byte 1: See Description of SIC0INBUFH[INPUT1]. |
| 15 . . . 8 | INPUT2 | R | 0x0 | Input Byte 2: See Description of SIC0INBUFH[INPUT1]. |
| 7 . . . 0 | INPUT3 | R | 0x0 | Input Byte 3: See Description of SIC0INBUFH[INPUT1]. |

| | | SIC3INBUF SI Channel 3 Input Buffer Low | | |
| --- | --- | --- | --- | --- |
| | | Mnemonic: | SIC3INBUFL | |
| | | Offset: | 0x2C | |
| | | Size | 32 bits | |
| | | | SIC4INBUFL | |

| Bits | Mnemonic | Type | Reset | Description |
| --- | --- | --- | --- | --- |
| 31 . . . 24 | INPUT4 | R | 0x0 | Input Byte 4: See Description of SIC0INBUFH[INPUT1]. |
| 23 . . . 16 | INPUT5 | R | 0x0 | Input Byte 5: See Description of SIC0INBUFH[INPUT1]. |
| 15 . . . 8 | INPUT6 | R | 0x0 | Input Byte 6: See Description of SIC0INBUFH[INPUT1]. |
| 7 . . . 0 | INPUT7 | R | 0x0 | Input Byte 7: See Description of SIC0INBUFH[INPUT1]. |

| | | SIPOLL SI Poll Register | | |
| --- | --- | --- | --- | --- |
| | | Mnemonic: | SIPOLL | |
| | | Offset: | 0x30 | |
| | | Size | 32 bits | |
| | | | SIPOLL | |

| Bits | Mnemonic | Type | Reset | Description |
| --- | --- | --- | --- | --- |
| 31 . . . 26 | | R | 0x0 | Reserved |
| 25 . . . 16 | X | RW | 0x07 | X lines register: determines the number of horizontal video lines between polling (the polling interval). The polling begins at vsync. 0x07 is the minimum setting (determined by the time required to complete a single polling of the controller). The maximum setting depends on the current video mode (number of lines per vsync) and the SIPOLL[Y] register. This register takes affect after vsync. |
| 15 . . . 8 | Y | RW | 0x0 | Y times register: This register determines the number of times the SI controllers are polled in a single frame. This register takes affect after vsync. |
| 7 | EN0 | RW | 0x0 | Enable channel 0: Enable polling of channel 0. When the channel is enabled, polling begins at the next vblank. When the channel is disabled, polling is stopped immediately after the current transaction. The status of this bit does not affect communication RAM transfers on this channel.<br>1 = Polling of channel 0 is enabled<br>0 = Polling of channel 0 is disabled |

-continued

| Bits | Mnemonic | Type | Reset | Description |
|---|---|---|---|---|
| 6 | EN1 | RW | 0x0 | Enable channel 1: See description for SIPOLL[EN0]. |
| 5 | EN2 | RW | 0x0 | Enable channel 2: See Description for SIPOLL[EN0]. |
| 4 | EN3 | RW | 0x0 | Enable channel 3: See Description for SIPOLL[EN0]. |
| 3 | VBCPY0 | RW | 0x0 | Vblank copy output channel 0: Normally main processor writes to the SIC0OUTBUF register are copied immediately to the channel 0 output buffer if a transfer is not currently in progress. When this bit is asserted, main processor writes to channel 0's SIC0OUTBUF will only be copied to the outbuffer on vblank. This is used to control the timing of commands to 3D LCD shutter glasses connected to the VI.<br>1 = Copy SIC0OUTBUF to output buffer only on vblank.<br>0 = Copy SIC0OUTBUF to output buffer after writing. |
| 2 | VBCPY1 | RW | 0x0 | Vblank copy output channel 1: See Description for SIPOLL[VBCPY0]. |
| 1 | VBCPY2 | RW | 0x0 | Vblank copy output channel 2: See Description for SIPOLL[VBCPY0]. |
| 0 | VBCPY3 | RW | 0x0 | Vblank copy output channel 3: See Description for SIPOLL[VBCPY0]. |

SIC0MCSR SI Communication Control Status Register
Mnemonic: SIC0MCSR
Offset: 0x34
Size 32 bits
SIC0MCSR

| Bits | Mnemonic | Type | Reset | Description |
|---|---|---|---|---|
| 31 | TCINT | RWC | 0x0 | Transfer Complete Interrupt Status and clear. On read this bit indicates the current status of the communication transfer complete interrupt. When a '1' is written to this Register, the interrupt is cleared.<br>Write:<br>0 = No effect<br>1 = Transfer Complete Interrupt<br>Read:<br>0 = Transfer Complete Interrupt not requested<br>1 = Transfer Complete Interrupt has been requested |
| 30 | TCINTMSK | RW | 0x0 | Transfer Complete Interrupt Mask: Interrupt masking prevents the interrupt from being sent to the main processor, but does not affect the assertion of SICOMCSR[TCINT]<br>0 = Interrupt masked<br>1 = Interrupt enabled |
| 29 | COMERR | R | 0x0 | Communication Error: This indicates whether the last SI communication transfer had an error. See SiSr for the cause of the error.<br>0 = No error<br>1 = Error on transfer |
| 28 | RDSTINT | R | 0x0 | Read Status Interrupt Status and clear. On read this bit indicates the current status of the Read Status interrupt. The interrupt is set whenever SISR[RDSTn] bits are set. The interrupt is cleared when all of the RdSt bits in the SISR are cleared by reading from the Si Channel Input Buffers. This interrupt can be used to indicate that a polling transfer has completed and new data is captured in the input registers<br>Read:<br>0 = Transfer Complete Interrupt not requested<br>1 = Transfer Complete Interrupt has been requested |
| 27 | RDSTINTMSK | RW | 0x0 | Read Status interrupt Mask: Interrupt masking prevents the interrupt from being sent to the main processor, but does not affect the assertion of SICOMCSR[RDSTINT]<br>0 = Interrupt masked<br>1 = Interrupt enabled |
| 26 ... 23 | | R | 0x0 | Reserved |
| 22 ... 16 | OUTLNGTH | RW | 0x0 | Communication Channel Output Length in bytes. Minimum transfer is 1 byte. A value of 0x00 will transfer 128 bytes. These bits should not be modified while SICOM transfer is in progress. |
| 15 | | R | 0x0 | Reserved |

-continued

| | | | | |
|---|---|---|---|---|
| 14...8 | INLNGTH | RW | 0x0 | Communication Channel Output Length in bytes. Minimum transfer is 1 byte. A value of 0x00 will transfer 128 bytes. These bits should not be modified while SICOM transfer is in progress. |
| 2...1 | CHANNEL | RW | 0x0 | Channel: determines which SI channel will be used the communication interface.<br>00 = Channel 1<br>01 = Channel 2<br>10 = Channel 3<br>11 = Channel 4<br>These bits should not be modified while SICOM transfer is in progress. |
| 0 | TSTART | RW | 0x0 | Transfer Start: When a '1' is written to this register, the current communication transfer is executed. The transfer begins immediately after the current transaction on this channel has completed. When read this bit represents the current transfer status. Once a communication transfer has been executed, polling will resume at the next vblank if the channel's SIPOLL[ENn] bit is set.<br>Write:<br>0 = Do not start command<br>1 = Start command<br>Read:<br>0 = Command Complete<br>1 = Command Pending |

When programming the SICOMCSR after a SICOM transfer has already started (e.g., SICOMCSR[TSTART] is set), the example software reads the current value first, then and/or in the proper data and then writes the new data back. The software should not modify any of the transfer parameters (OUTLNGTH, INLNGTH, CHANNEL) until the current transfer is complete. This is done to prevent a SICOM transfer already in progress from being disturbed. When writing the data back, the software should not set the TSTART bit again unless the current transfer is complete and another transfer is required.

SISI SI Status Register
Mnemonic: SISR
Offset: 0x38
Size: 32 bits

SISR

| Bits | Mnemonic | Type | Reset | Description |
|---|---|---|---|---|
| 31 | WR | RW | 0x0 | Write SICnOUTBUF Register: This register controls and indicates whether the SICnOUTBUFs have been copied to the double-buffered output buffers. This bit is cleared after the buffers have been copied.<br>Write<br>1 = Copy all buffers<br>0 = No effect<br>Read<br>1 = Buffer not copied<br>0 = Buffer copied |
| 30 | | R | 0x0 | Reserved |
| 29 | RDST0 | R | 0x0 | Read Status SIC0INBUF Register: This register indicates whether the SIC0INBUFs have been captured new data and whether the data has already been read by the main processor (read indicated by main processor read of SIC0INBUF[ERRSTAT, ERRLATCH, INPUT0, INPUT1)]<br>1 = New data available, not read by main processor<br>0 = No new data available, already read by main processor |
| 28 | WRST0 | R | 0x0 | Write Status SIC0OUTBUF Register: This register indicates whether the SIC0OUTBUFs have been copied to the double buffered output buffers. This bit is cleared after the buffers have been copied. |

-continued

| | | | | |
|---|---|---|---|---|
| | | | | 1 = Buffer not copied |
| | | | | 0 = Buffer copied |
| 27 | NOREP0 | RWC | 0x0 | No Response Error Channel 0: This register indicates that a previous transfer resulted in no response from the controller. This can also be used to detect whether a controller is connected. If no controller is connected, this bit will be set. Once set this bit remains set until it is cleared by the main processor. To clear this bit write '1' to this register.<br>Write:<br>0 = No effect<br>1 = Clear No Response Error<br>Read:<br>0 = No Response Error not asserted<br>1 = No Response Error asserted |
| 26 | COLL0 | RWC | 0x0 | Collision Error Channel 0: This register indicates data collision between controller and main unit. Once set this bit remains set until it is cleared by the main processor. To clear this bit write '1' to this register.<br>Write:<br>0 = No effect<br>1 = Clear Collision Error<br>Read:<br>0 = Collision Error not asserted<br>1 = Collision Error asserted |
| 25 | OVRUN0 | RWC | 0x0 | Over Run Error Channel 0: This register indicates that the main unit has received more data then expected. Once set this bit remains set until it is cleared by the main processor. To clear this bit write '1' to this register.<br>Write:<br>0 = No effect<br>1 = Clear Over Run Error<br>Read:<br>0 = Over Run Error not asserted<br>1 = Over Run Error asserted |
| 24 | UNRUN | RWC | 0x0 | Under Run Error Channel 0: This register indicates that the main unit has received less data then expected. Once set this bit remain set until it is cleared by the main processor. To clear this bit write '1' to this register.<br>Write:<br>0 = No effect<br>1 = Clear Under Run Error<br>Read:<br>0 = Under Run not asserted<br>1 = Under Run asserted |
| 23 . . . 22 | | R | 0x0 | Reserved |
| 21 | RDST1 | R | 0x0 | Read Status SIC1OINBUF Register: See SISR[RDST0]. |
| 20 | WRST1 | R | 0x0 | Write Status SIC0OUTBUF Register: See SISR[WRST0]. |
| 19 | NOREP1 | RWC | 0x0 | No Response Error Channel 1: See SISR[NOREP0]. |
| 18 | COLL1 | RWC | 0x0 | Collision Error Channel 1: See SISR[COLL0]. |
| 17 | OVRUN1 | RWC | 0x0 | Over Run Error Channel 1: See SISR[OVRUN0]. |
| 16 | UNRUN1 | RWC | 0x0 | Under Run Error Channel 1: See SISR[UNRUN0]. |
| 15 . . . 14 | | R | 0x0 | Reserved |
| 13 | RDST2 | R | 0x0 | Read Status SIC1OINBUF Register: See SISR[RDST2]. |
| 12 | WRST2 | R | 0x0 | Write Status SIC0OUTBUF Register: See SISR[WRST2]. |
| 11 | NOREP2 | RWC | 0x0 | No Response Error Channel 2: See SISR[NOREP0]. |
| 10 | COLL2 | RWC | 0x0 | Collision Error Channel 2: See SISR[COLL0]. |
| 9 | OVRUN2 | RWC | 0x0 | Over Run Error Channel 2: See SISR[OVRUN0]. |
| 8 | UNRUN2 | RWC | 0x0 | Under Run Error Channel 2: See SISR[UNRUN0]. |
| 7 . . . 6 | | R | 0x0 | Reserved |
| 5 | RDST3 | R | 0x0 | Read Status SIC1OINBUF Register: See SISR[RDST2]. |
| 4 | WRST3 | R | 0x0 | Write Status SIC0OUTBUF Register: See SISR[WRST2]. |
| 3 | NOREP3 | RWC | 0x0 | No Response Error Channel 3: See SISR[NOREP0]. |
| 2 | COLL3 | RWC | 0x0 | Collision Error Channel 3: See SISR[COLL0]. |
| 1 | OVRUN3 | RWC | 0x0 | Over Run Error Channel 3: See SISR[OVRUN0]. |
| 0 | UNRUN3 | RWC | 0x0 | Under Run Error Channel 3: See SISR[UNRUN0]. |

SIEXILK SI EXI Clock Lock
Mnemonic: SIEXILK
Offset: 0x3C

-continued

Size 32 bits
SIEXILK

| Bits | Mnemonic | Type | Reset | Description |
|---|---|---|---|---|
| 31 | LOCK | RW | 0x1 | Lock: This bit prevents the main processor from setting the EXI clock frequencies to 32 MHz.<br>0 = EXI Clocks Unlocked, 32 MHz EXICLK setting permitted.<br>1 = EXI Clock Locked, 32 MHz EXICLK setting not permitted. |
| 30 . . . 0 | | R | 0x0 | Reserved |

Figure 8:
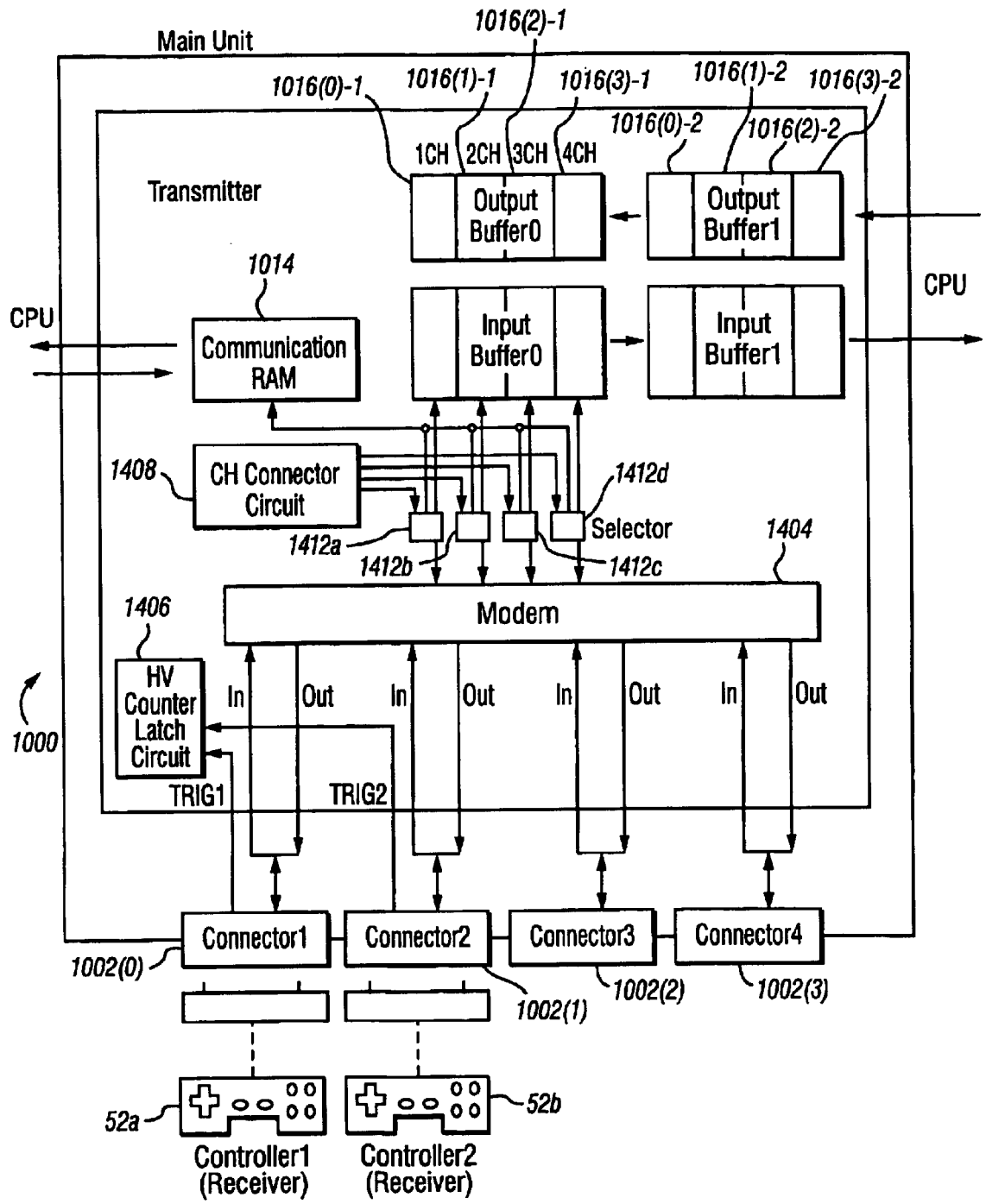
FIG. 8 shows a more detailed view of the serial interface of FIGS. 7A and 7B.

FIG. 8 is an even more detailed overall view of serial interface 1000. Controllers 52a and 52b (and 52c and 52d, if present) are connected to game console 54 via connector ports 1002. Modem 1404 modulates and demodulates data transferred between the controllers and the console. In the example system, communication between the console and the controllers uses duty-cycle (pulse-width) modulation and the data is communicated over one line. The communication is half-duplex. The byte transfer order is "big-endian" in which within a given multi-byte numeric representation, the most significant byte has the lowest address (i.e., the data is transferred "big-end" first). Controller input/output buffer 1016 is used for normal data transfers involving controllers 52a–52d. As shown in FIG. 8 and as will be explained in greater detail below, input/output buffer 1016 is arranged as a double buffer. Communication RAM 1014 is provided for use in variable-size data transfers to and from controllers 52a–52d. In the example system, the maximum data size of these variable-size data transfers is 32 words. Of course, the present invention is not limited in this respect. Channel selector circuit 1408 controls selectors 1412a–1412d to selectively connect modem 1404 to either communication RAM 1014 or input/output buffer 1016. An HV counter latch circuit 1406 latches the screen position of a flash signal when a trigger input is received from a light gun unit. In the example system shown in FIG. 8, triggers inputs to the HV counter latch circuit 1406 are provided for connectors 1 and 2 only. It will be apparent that trigger inputs may be provided for the other connectors if desired. HV counter latch circuit 1406 may also be used with light pens connected to connectors 1 and/or 2.

Figure 9:
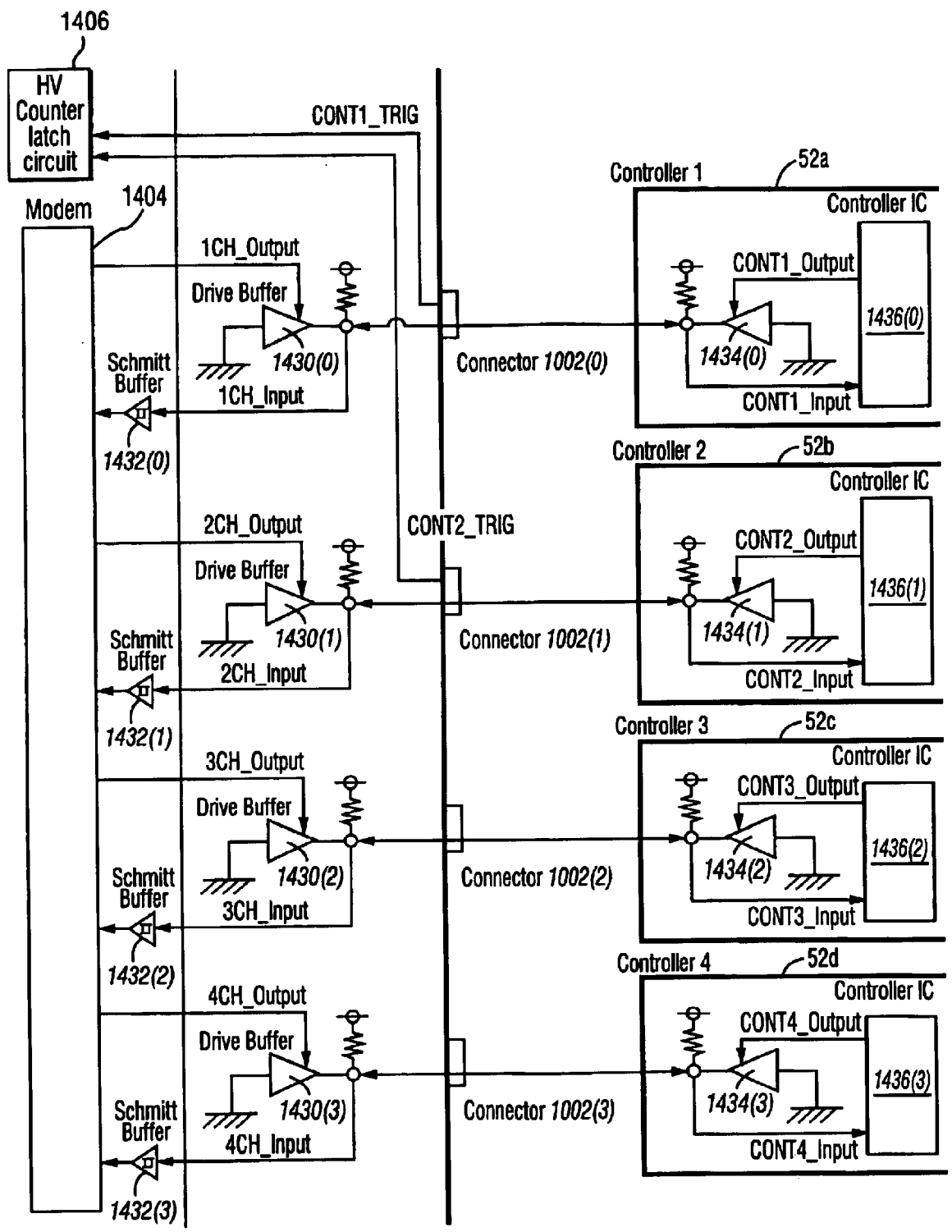
FIG. 9 shows a more detailed view of a portion of the serial interface shown in FIG. 8.

FIG. 9 shows additional details of the connections between controllers 52a–52d and serial interface 1000. The outputs of modem 1404 are supplied to controllers 52a–52d through open-drain driver buffers 1430 and the inputs from controllers 52a–52d are supplied to modem 1404 through Schmitt buffers 1432. Similarly, the outputs of controllers 52a–52d are supplied to serial interface 1000 through driver buffers 1434. The outputs to controllers 52a–52d from serial interface 1000 are supplied to controller integrated circuits (ICs) 1436.

Figure 10:
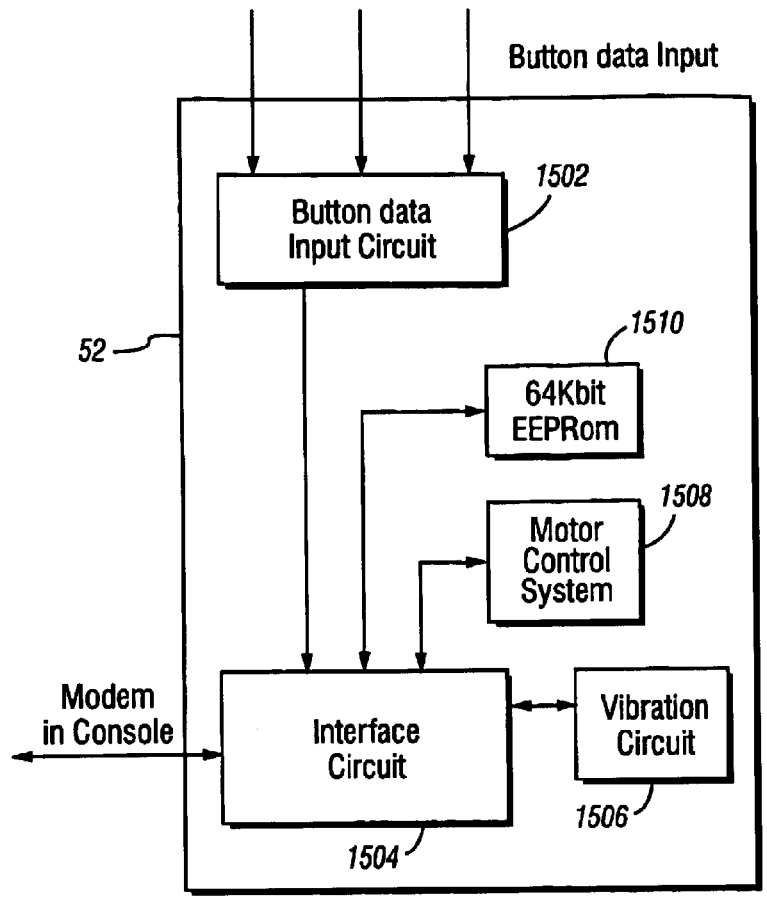
FIG. 10 shows an example controller.

FIG. 10 shows details of one of controllers 52. Controller 52 is connected to serial interface 1000 via a cable (not shown) about 2 meters in length in the example system. In other implementations, the communication between the controllers and the console may be over a wireless communication path such as infrared or radio frequency. Controller 52 contains an interface circuit 1504 arranged between the controller components and serial interface 1000. A button data input circuit 1502 accepts inputs from buttons disposed on an external surface of controller 52. "Buttons" as used herein refers to any device that is manipulable by a user to cause a game or other application to start, characters to move, etc. and includes, for example, buttons, switches, joysticks, and the like. The length of the controller button and status data that is provided to serial interface 1000 is 64 bits. Vibration circuit 1506 is responsive to signals from main unit 54 via serial interface 1000 for selectively vibrating the housing of controller 52 to provide sensations to the a game player. Controller 52 also includes a 64 kbit EEPROM 1510 with a unique identifier number that is usable, for example, to store game back-up data, high game scores, etc. Controller 52 also includes a motor control system 1508 for controlling an external motor and two output ports (not shown) connectable to external components such as a motor.

Polling Via Serial Interface 1000

The input/output data size is fixed in the standard command/response packet in the example implementation. This packet is used primarily for reading data of the controllers. This data includes data indicative of which buttons are being pressed, is there a controller plugged in, the value of the analog joysticks, etc. This data is used as player input for a game (e.g., move character left/right, look up/down, fire gun, etc.). Because the polling of the controllers is performed by serial interface 1000, the workload of main processor 110 is reduced. Thus, for example, the last state of the controller 52 is in the double-buffered processor input/output register 1016 so that main processor 110 can simply read the register to determine the controller state.

An output command packet includes a 1-byte command and 2 bytes of data. With reference to the serial interface register map set forth above, SIC0OUTBUF for sending a command packet to a controller connected to connector port 1002(0), for example, includes a command byte register CMD that is an opcode for the command sent to the controller during each command/response packet. OUTPUT0 and OUTPUT1 registers are for first and second data bytes of the command packet. An input response packet includes 8 bytes of data, of which 62 bits are button data and 2 bits are controller status bits. Again with reference to the serial interface register map, SIC0INBUF (SI Channel 0 Input Buffer High) for receiving the response packet from the controller includes ERRSTAT, ERRLATCH, INPUT0, INPUT1, INPUT2 and INPUT3 registers. The ERRSTATUS bit represents the current error status for the last polling transfer on channel 0. This register is updated after each polling transfer on this channel. The ERRLATCH bit is an error status summary of the error bits for channel 0. If an error has occurred on a past transfer on channel 0 (polling or a transfer from communication RAM 1014), this bit will be set. To determine the exact error, the SISR register (see register map) may be read. The ERRLATCH bit is actually an "or" of the latched error status bits for channel 0 in the SISR. The bit is cleared by clearing the appropriate error status bits latched in the SISR. The no response error indicates that a controller is not present on the channel. INPUT0, INPUT1, INPUT2 and INPUT3 are first through fourth data bytes of the response packet sent from controller 52 to serial interface 1000 for channel 0. In the example, implementation, the most significant two bits of INPUT0 are assumed to be "0", so they are not included in INPUT0. The fifth through eighth data bytes of the response packet are in the register SIC0INBUF (SI Channel 0 Input Buffer Low).

Figure 12:
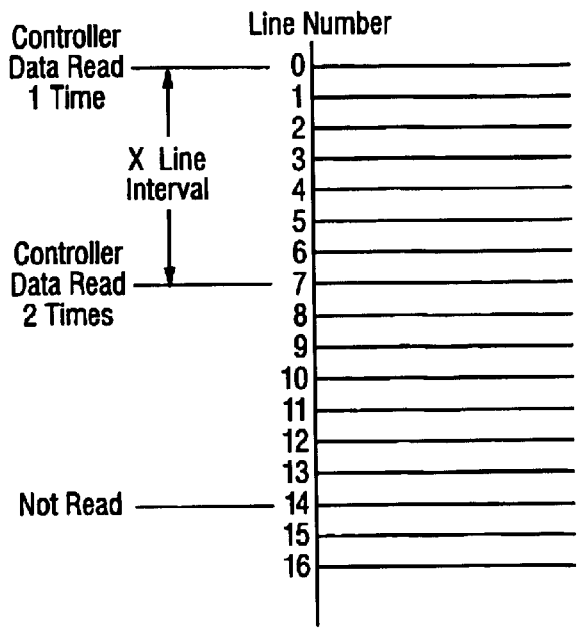
FIG. 12 is used to illustrate the meaning of the X line interval register and the Y times register.

The characteristics of the polling of the controllers are determined in accordance with registers in SIPOLL (SI Poll Register). With reference to the register map, SIPOLL includes an X lines register and a Y times register. The X lines register determines the number of horizontal video lines between polling ("the polling interval"). The polling interval begins at the beginning of vertical blanking as shown in FIG. 12. 0x07 is the minimum setting for the X lines register as determined by the time required to complete a single polling of the controller in the example system. The maximum setting depends on the current video mode (the number of lines between vertical sync signals) and the Y times register. Of course, the invention is not limited to any particular maximum or minimum settings. The Y times register determines the number of times the controllers are polled in a single frame. This is also shown in FIG. 12.

Thus, in the controller polling process, main processor 110 writes a command to one or more of the output buffers and sets the X line and Y times registers. When main processor 110 sets one or more enable registers EN0, EN1, EN2 and EN3 of the SI Poll Register to "1", continuous polling of the corresponding controllers is started. The polling of the enabled channels is started at the same time and serial interface 1000 starts to poll at the beginning of vertical blanking and polling is repeated Y times per one frame. As noted above, the interval between pollings is determined in accordance with the setting of the X line register and the relationship between X line interval and Y times per frame is illustrated in FIG. 12. When main processor 110 sets the X line register, the Y times register and the enable register(s), controller access is started at the next vertical blanking. In the example implementation, the default setting for the Y times register is "0". Therefore, main processor 110 must set this register to use the controllers. To stop polling of a particular controller, its enable bit is set to 0; polling is stopped immediately after the current transaction.

As mentioned above, input/output buffer 1016 is actually a double buffer. The output buffer is comprised of 3 bytes for each of the four channels as described above. With reference to FIG. 8, the output data is copied from output buffer 1 to output buffer 0 of the double buffer when main processor 110 finishes writing to output buffer 1. A WR register of SISR (SI Status Register) controls and indicates whether the SICnOUTBUFs have been copied to the double buffered output buffers. The bit is set to "1" when the buffer is not yet copied and is cleared to "0" when copying is completed. Thus, if "0" is returned when main processor 110 reads WR, the copy operation is complete. If "1" is returned, the copy operation is not complete. Thus, this register must be "0" before main processor 110 writes to buffer 1. While data is transmitted from buffer 0 to the controller, copy from buffer 1 to buffer 0 is locked.

The input buffer is 8 bytes for each of the four channels and input data is copied from input buffer 0 to input buffer 1 after the controller data is received. Main processor 110 reads input buffer 1 directly per 32 bits. If new data were to be written to the low 32 bits while main processor 110 is reading the high 32 bits, the data may be incorrect. Accordingly, when main processor 110 is reading the upper 32 bits, input buffer 1 is locked. When main processor 110 starts to read the lower 32 bits, buffer 1 is unlocked.

Ordinarily, output data is copied from buffer 1 to buffer 0 immediately after it is written to output buffer 1 by main processor 110. However, the copying may also be timed to start with vertical blanking in order to control the timing of commands to 3D LCD shutter glasses connected to display controller 164. To enable such timing, VBCPY may be set to "1" so that copies to buffer 0 occur only upon vertical blanking. The default value for the VBCPY bits is "0".

The size of the data involved in the polling is fixed. However, there are occasions on which it is desirable to transfer larger amounts of data between main console 54 and controllers 52 (e.g., writing game data to a nonvolatile memory built-in or attached to controller 52). Example serial interface 1000 provides the capability of transferring larger amounts of data in accordance with a process that is explained with reference to FIG. 11. SICOMCSR (SI Communication Control Status Register) includes a register OUTLNGTH for setting the communication channel output length (in bytes); INLNGTH for setting the communication channel input length (in bytes); and CHANNEL for determining which serial interface channel will be used. The minimum transfer that may be designated by OUTLNGTH and INLNGTH is 1 byte. A value of 0×00 will transfer 128 bytes. To transfer data, command and output data is set to communication RAM 1014 and main processor 110 sets the OUTLNGTH, INLNGTH and CHANNEL registers. The setting ("1") of the TSTART bit register causes execution of the current communication transfer. The transfer begins immediately after the current transaction on the designated channel is completed. When read, the TSTART bit represents the current transfer status. Once a communication transfer is executed, polling resumes at the next vertical blanking interval if the channels EN bit is set.

Figure 11:
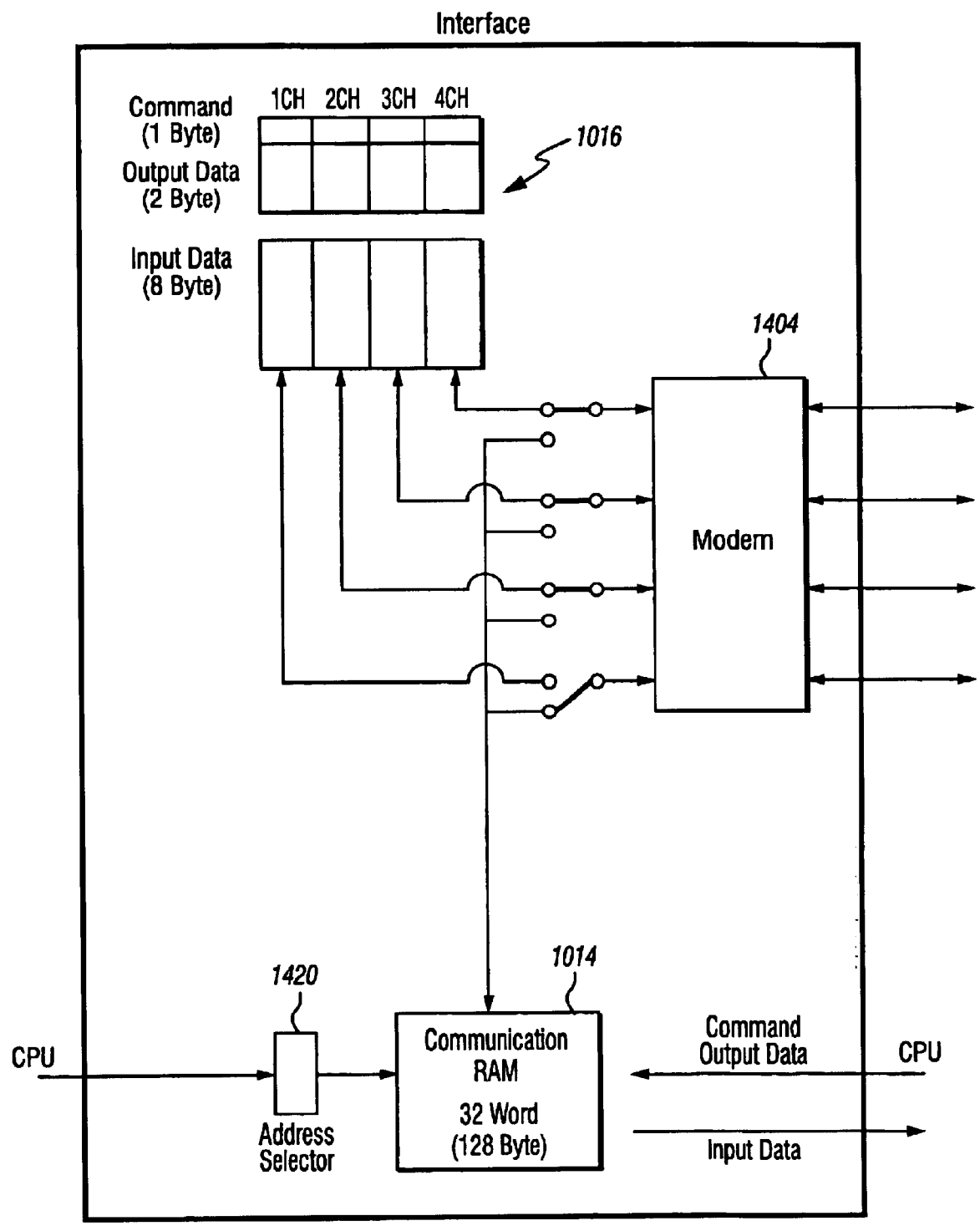
FIG. 11 shows the example system elements involved in data transfers using a communication RAM.

When main processor 110 sets the TSTART bit to "1", the transfer mode of the channel designated in the CHANNEL register is changed to Communication RAM mode by selector circuit 1408 (see FIG. 8) which controls the appropriate selector circuit to connect that channel to communication RAM 1014. In the example of FIG. 11, channel 1 is the designated channel. Output data is then transmitted from communication RAM 1014 and is output to controller 52 via modem 1404. Controller 52 may also transmit input data to channel 1 and this data is communicated to communication RAM 1014 via selector 1412a. The input data is pushed from communication RAM 1014 to main processor 110. Modem 1404 automatically clears the TSTART bit when the transfer is complete.

During Communication RAM transfer mode on channel 1, the remaining channels (i.e., channels 2, 3 and 4) continue to transfer data using input/output buffer 1016. During communication RAM transfers, main processor 110 generates an Addr CRC and transmits the CRC to the controller. The controller processes the Addr CRC to check that the data has been correctly received. In the case of a communication RAM transfer, the controller returns Data CRC. The main processor 110 generates a data CRC and compares this with the controller returned Data CRC.

Figure 13:
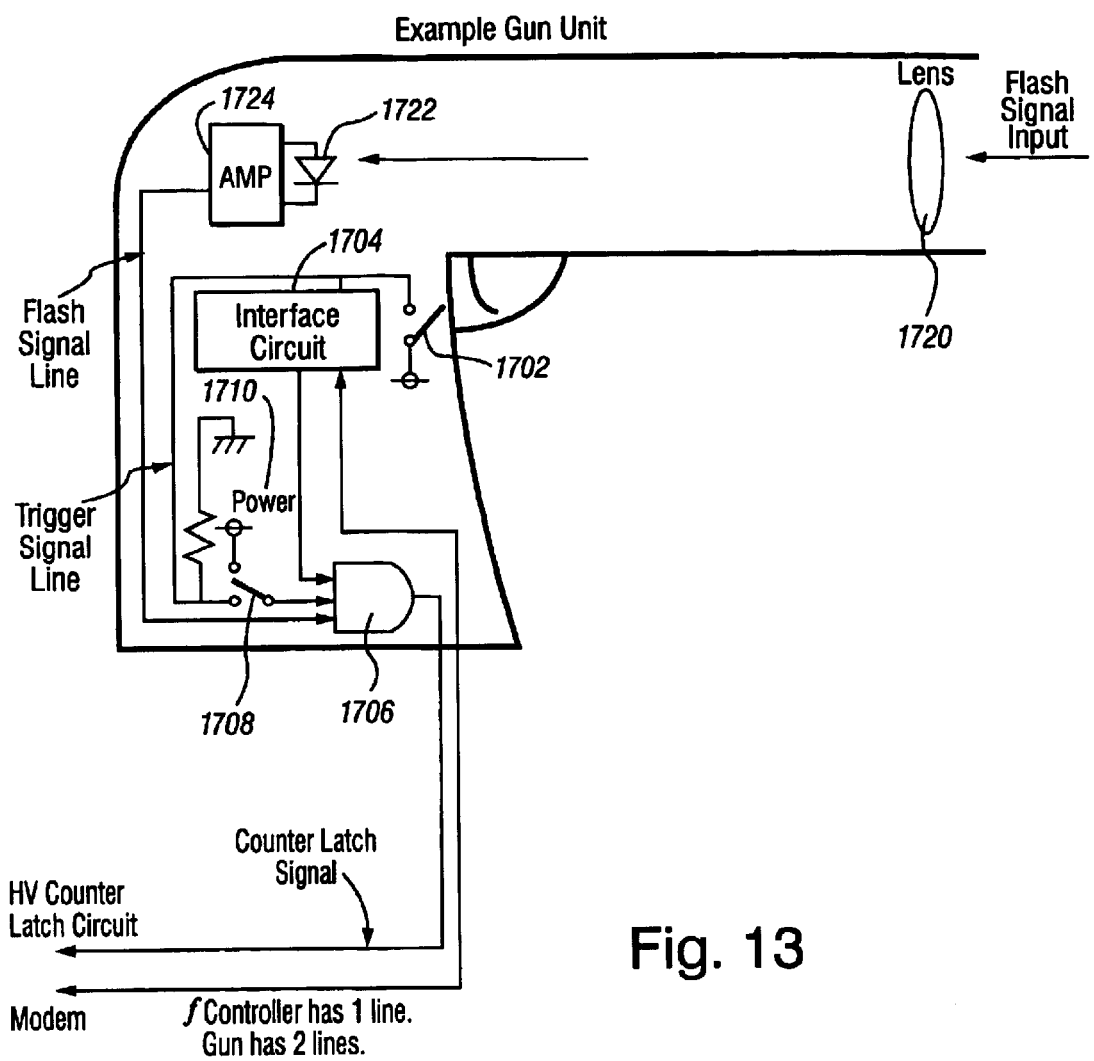
FIG. 13 shows an example light gun.

FIG. 13 illustrates an example light gun connectable to connector port 1002(0) or 1002(1) of main console 54. Various types of light guns may be used and two of these types are discussed below. A first type detects a target point within one frame and generally requires that the screen and/or the target point be a bright color. A second type requires two frames to detect the target point because main processor 110 flashes the screen after detection of the trigger button and starts to detect the target point at the next frame. This second type of gun typically does not require the screen to be as bright as is needed for guns of the first type. HV counter latch circuit 1406 is usable in connection with either type of light gun. The light gun includes a gun trigger 1702. If gun trigger 1702 is pulled, a trigger signal input is transmitted for one frame. A flash signal input passing through lens 1720 is detected by a photodetector 1722, amplified by an amplifier 1724 and supplied to logic circuit 1706 as the flash signal. Interface circuit 1704 controls whether the flash signal is passed via logic gate 1706 by controlling the signal level on the flash signal control line. If the flash signal control line is high, the flash signal is passed to HV counter latch circuit as a counter latch signal. Interface circuit 1704 controls whether the trigger signal is passed. A trigger control switch 1708 is selectively connected to power source 1710 or the trigger signal line.

In the first type of light gun, as soon as trigger 1702 is pulled, the gun starts to detect the flash signal and, if the flash signal is detected, the counter latch signal is transmitted. In the second type of light gun, when trigger 1702 is pulled, main processor 110 starts to flash the screen at the next frame. The flash signal is detected during this frame and the counter latch signal is transmitted. With a light pen, the flash signal is detected per frame and the counter latch signal is transmitted per frame.

A Gun Trigger Mode register determines the gun trigger mode and enables the counter latch register for each of channels 1 and 2. An "always" mode is set so that the gun detects the flash signal per frame. This mode may be set for the first type of light gun and the light pen. A "1 frame" and "2 frame" mode is set so that the gun detects a flash signal for 1 or 2 frames. These modes may be set for the second type of light gun.

The HV latch counter circuit receives a counter latch signal transmitted from the light gun. In this case, the position of the flash signal is latched to the HV counter latch register. The register is shared by the 2 channels.

| | |
|---|---|
| HV counter latch | 32 bits (R) |
| Horizontal count | [10 . . . 0] bits |
| Vertical count | [20 . . . 12] bits |
| Field | bit 24 |
| Counter latch signal | bit 31 |

Figure 14A:
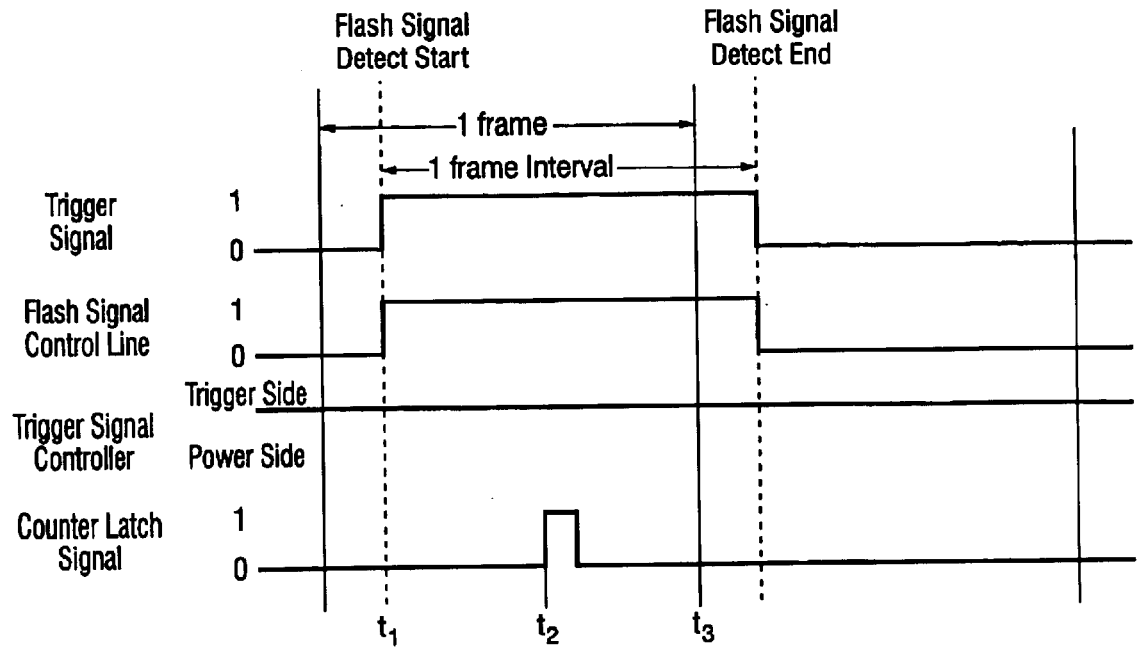
FIGS. 14A–14C are timing diagrams for explaining the light gun and light pen operations.

FIG. 14A depicts the output timing of the counter latch signal for the light gun of the first type. As noted above, the screen should preferably be bright for this type of light gun because the gun needs to detect a flash signal at any time. For this gun type, the trigger signal controller is always connected to the trigger side. When the trigger is pulled, flash signal detection is started. If the flash signal is detected within one frame, the counter latch signal is transmitted and the counter latch register gets the position of the flash signal. The action that results from pulling the trigger is drawn at the next frame.

Figure 14B:
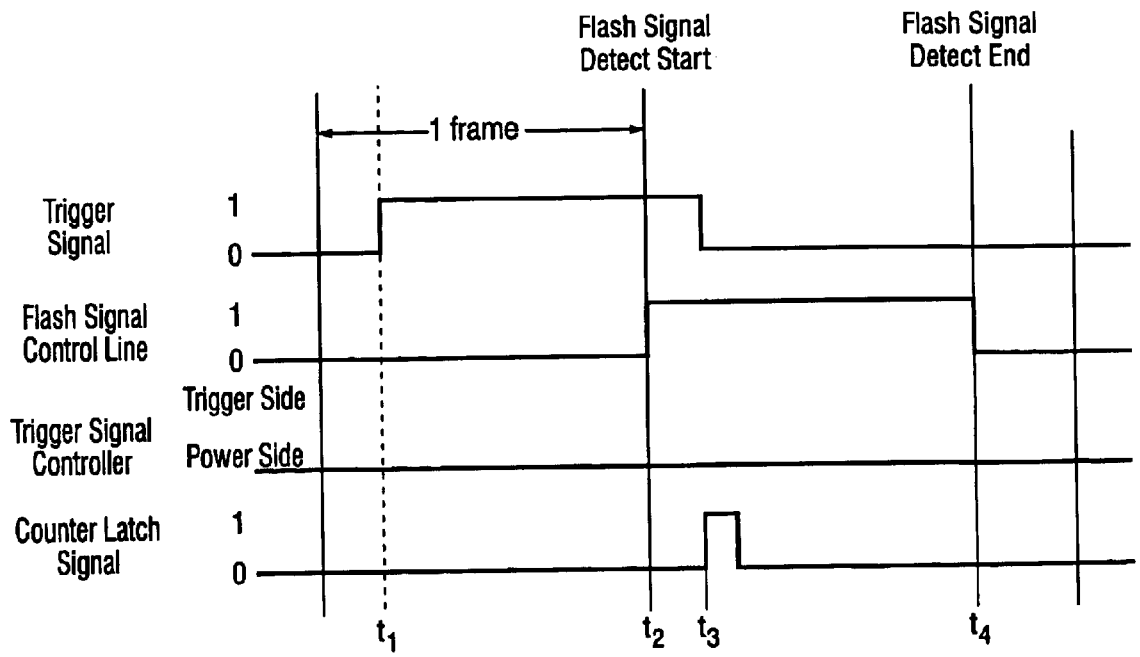

FIG. 14B depicts the output timing of the counter latch signal for the light gun of the second type. For this gun type, the trigger signal controller is always connected to the power side. When the trigger is pulled, the screen is a bright color at the next frame and flash signal detection is started. When the flash signal is detected, the counter latch signal is transmitted and the counter latch register gets the position of the flash signal. The action that results from pulling the trigger is drawn at the next frame.

Figure 14C:
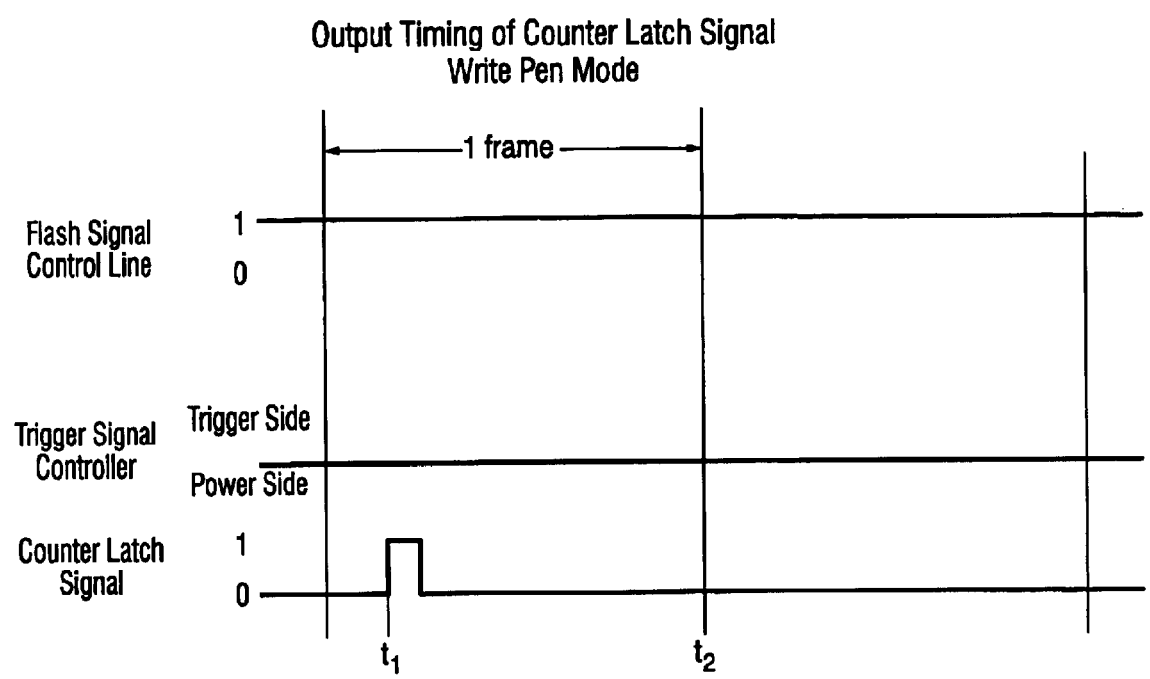

FIG. 14C depicts the output timing of the counter latch signal for the light pen. The screen is preferably bright for this type of light gun because the gun needs to detect a flash signal at any time. The trigger signal controller is always connected to the power side and the flash signal control line is always set to 1. The flash signal is detected per frame. The counter latch signal is transmitted and the counter latch register gets the position of the flash signal. The action that results from touching the pen on the screen is drawn at the next frame.

Example Signal Form

The signal form of the data is made up of a separation signal, a bit signal, an end signal and a continue signal.

Figure 15A:
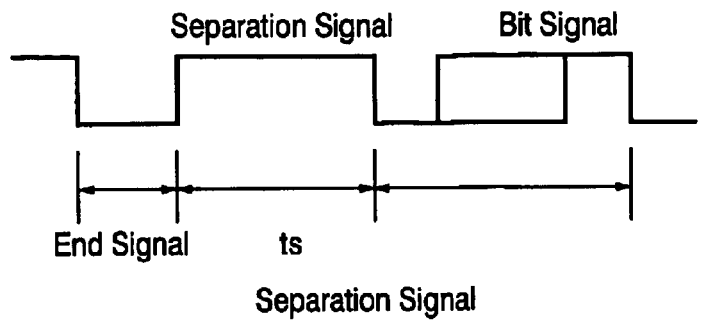
FIGS. 15A–15E depict signals used in data transfer.

FIG. 15(A) depicts a separation signal that is used to distinguish the end of transmission. The separation signal is transmitted before the transmitter (main unit 54) transmits a command and the receiver (controller 52) distinguishes the start of the command. Thus, it is important that the receiver distinguishes this signal.

Figure 15B:
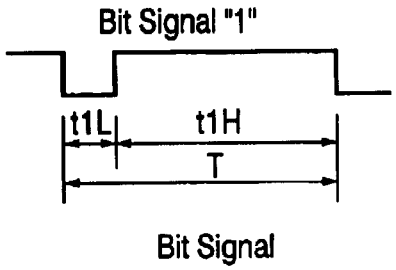
Figure 15C:
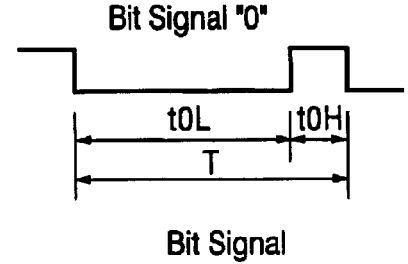

FIGS. 15(B) and 15(C) depict bit signals that are transmitted using the DATA line. The bit signals are duty-cycle (pulse-width) modulated as shown in FIGS. 15(B) and 15(C).

Figure 15D:
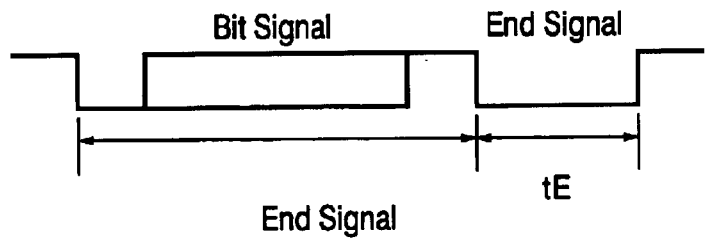

FIG. 15(D) depicts an end signal for indicating the end of the bit signal transmission. The bit signal ends by falling from high level to low level so the data line is still at low level. However, to release the data line, the transmitter must return the data line to high level. The end signal is used for this purpose.

Figure 15E:
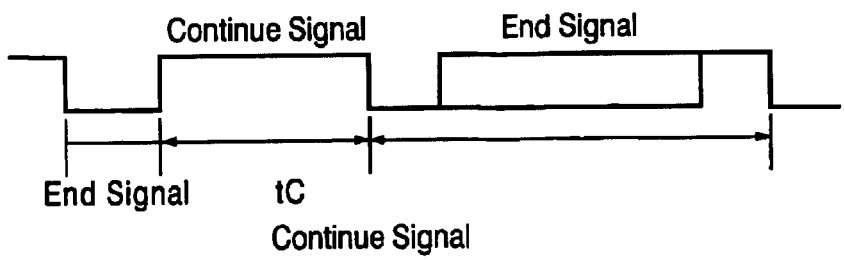

FIG. 15(E) depicts a continue signal used to change the direction of transmission. The transmitter returns the data line to high level and next the transmitter starts to transmits the Bit signal after a few intervals. The interval between the End signal and the Bit signal is the Continue signal. This signal is controlled by the next transmitter and is used when the receiver replies to a command of the transmitter.

Example Communication Protocol

Figure 16A:
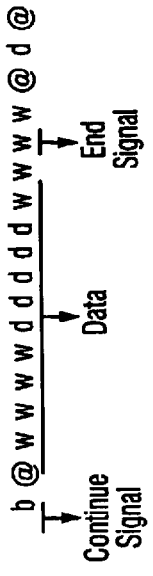
FIG. 16 illustrates the communication protocol between the serial interface and the controllers.
Figure 16B:
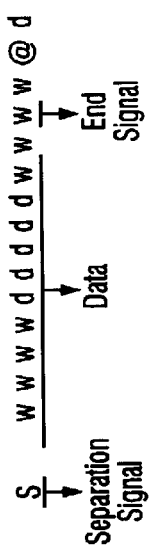

FIGS. 16A and 16B depict frame units in which communication over the communication path occurs. The transmitter transmits the Command frame shown in FIG. 16A and the receiver responds to the transmitter with a Response frame shown in FIG. 16B. As shown in FIG. 16A, the Command frame includes a separation signal, data and an end signal. As shown in FIG. 16B, the Response frame includes a continue signal, data and an end signal. The data is 8-bit aligned.

Example Channel Lines

Figure 17:
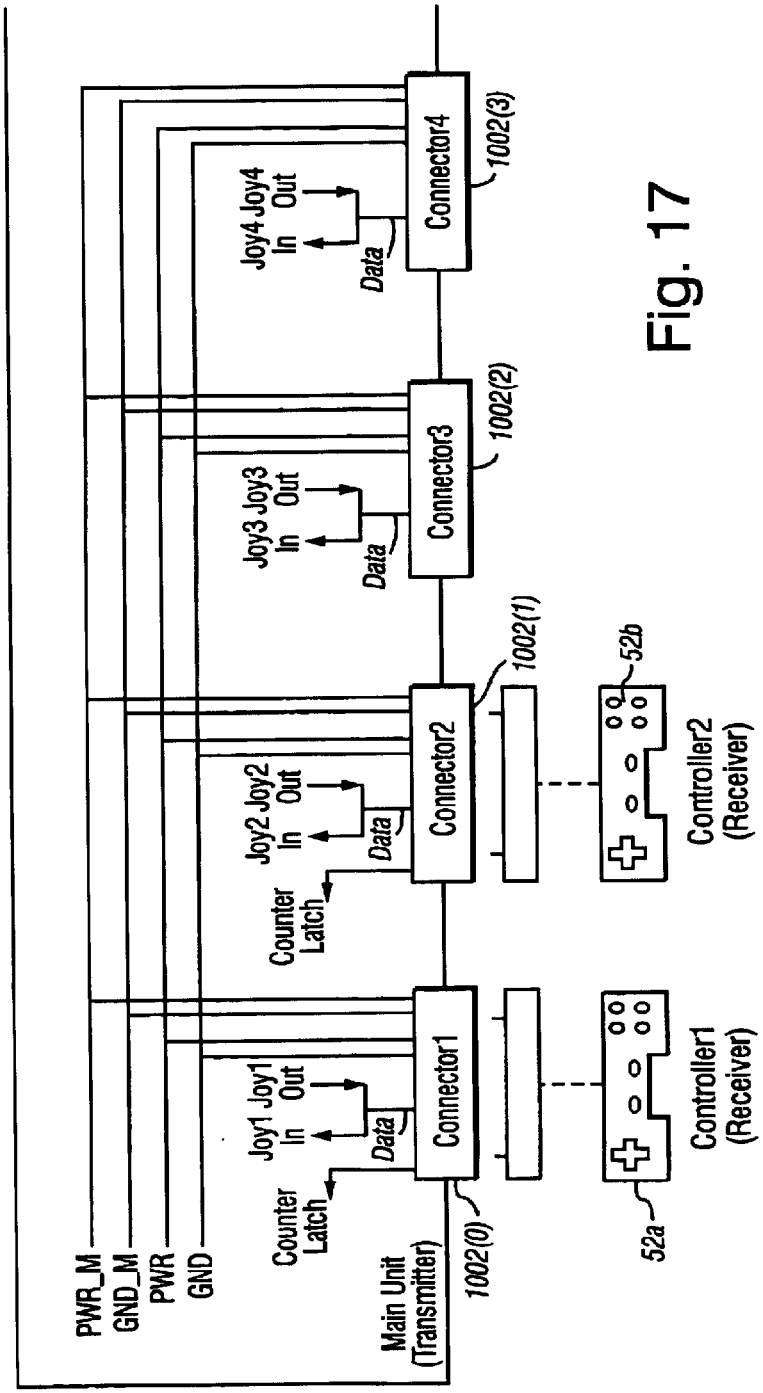
FIG. 17 depicts the lines for the channels of serial interface 1000.

FIG. 17 depicts the lines for the channels of serial interface 1000. A GND line is connected to a ground terminal and a PWR line connected to a VDD terminal is used to supply power from main console 54 to controller 52. The DATA line is used to transfer data between main console 54 and controller 52. DATA line is bi-directional and half-duplex. DATA line includes a wired-OR circuit and the transmitter pulls it to High level. The receiver may also pull it to High level. When the transmitter transmits signals, it pulls the DATA line to low level for certain times. The mechanical GND line and the mechanical PWR line are used when power is supplied to an external device coupled to the controller such as a motor. Finally, the counter latch line is used to transfer the flash signal detected from a light gun, a write pen, etc.

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 18A:
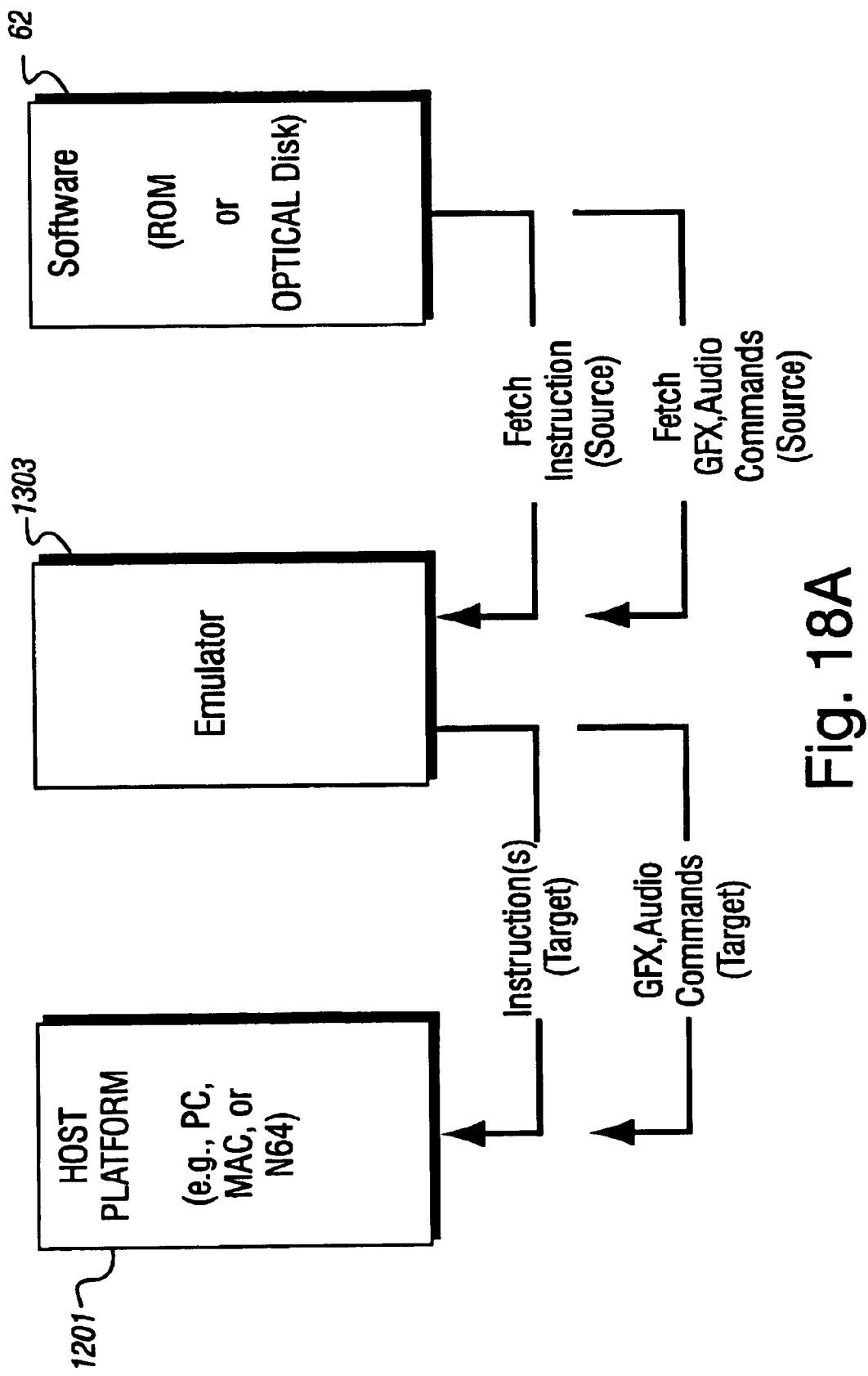
FIGS. 18A and 18B show example alternative compatible implementations.

FIG. 18A illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program. instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 62 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

Figure 18B:
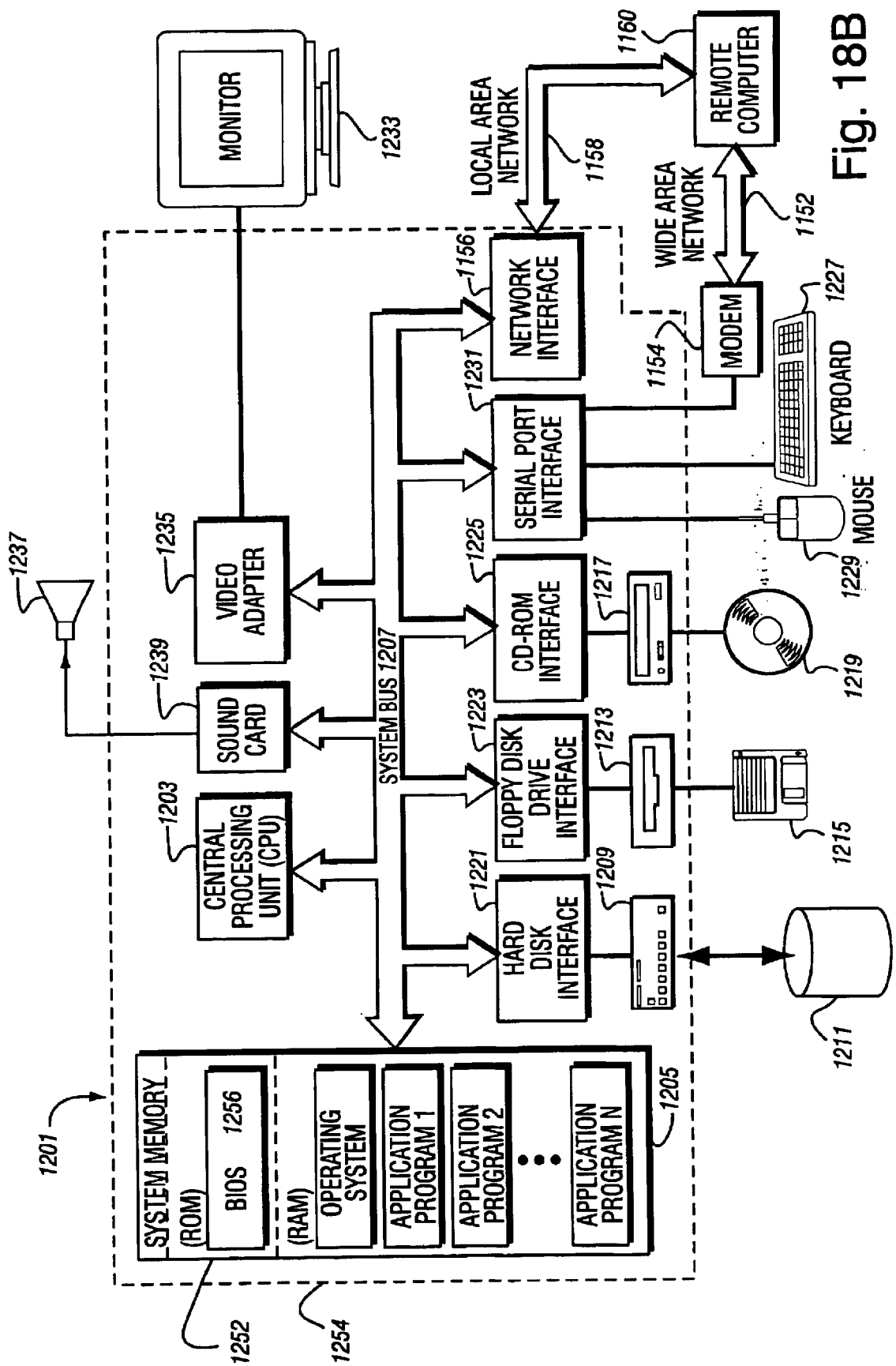

FIG. 18B illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

We claim:

1. A video game system, comprising:
   a game program executing system executing a game program;
   one or more controllers supplying user inputs to the game program executing system;
   an interface between the controllers and the game program executing system, the interface being programmable to periodically poll the controllers without involvement of the game program executing system, wherein the interface comprises:
   a double buffer for storing data transferred between the game program executing system and the controllers; and
   a status register comprising one or more bits which are indicative of a status of a copy operation for copying data from one buffer to another of the double buffer.

2. The video game system according to claim 1, wherein the interface is programmable to poll the controllers a predetermined number of times between each vertical blanking interval.

3. The video game system according to claim 1, wherein the interface is programmable to poll the controllers based on a number of video lines.

4. The video game system according to claim 1, wherein the interface polls a status of the controllers.

5. The video game system according to claim 4, wherein the status of the controllers includes data indicative of player inputs.

6. The video game system according to claim 5, wherein the player inputs comprise button presses.

7. The video game system according to claim 5, wherein the player inputs comprise positions of a user manipulable joystick.

8. The video game system according to claim 4, wherein the status of the controllers includes error data.

9. The video game system according to claim 8, wherein the error data is indicative of no response from a controller in response to a transfer of data thereto.

10. The video game system according to claim 8, wherein the error data is indicative of a data collision.

11. The video game system according to claim 8, wherein the error data is indicative of the game program executing system receiving more than a predetermined amount of data from the controller.

12. The video game system according to claim 8, wherein the error data is indicative of the game program executing system receiving less than a predetermined amount of data from the controller.

13. The video game system according to claim 1, the interface further comprising:
    selectors for selectively connecting the controllers to either the double buffer or the communication RAM.

14. The video game system according to claim 1, the interface further comprising:
    a modem.

15. The video game system according to claim 1, the controller including a vibration circuit for vibrating a housing of the controller.

16. The video game system according to claim 1, the controller including a read/write memory.

17. The video game system according to claim 1, further comprising:
    a communication RAM for storing data transferred between the game program executing system and the controllers.

18. The video game system according to claim 17, further comprising:
    a switching device for selectively connecting either the double buffer or the communication RAM to the controllers.

19. A video game system, comprising:
    a game program executing system executing a game program;
    a controller supplying user inputs to the game program executing system; and
    an interface interfacing between the game program executing system and the controller, the interface including communication circuitry operable in a first mode in which data of a fixed size is communicated between the game program executing system and the controller and in a second mode in which data of variable size is communicated between the game program executing system and the controller, wherein the interface further comprises:
    a communication memory for storing the variable size data;
    a double buffer for storing the fixed size data; and
    a switching device for selectively connecting either the double buffer or the communication memory to the controller.

20. The video game system according to claim 19, the interface further comprising:
    selectors for selectively connecting the controllers to either the double buffer or the communication RAM.

21. The video game system according to claim 19, the interface further comprising:
    a modem.

22. The video game system according to claim 19, further comprising:
    a status register comprising one or more bits indicative of a status of a copy operation for copying data from one buffer to another of the double buffer.

23. A video game system, comprising:
    a game program executing system having connectors connectable to one or more game controllers; and
    an interface between the connectors and the game program executing system, the interface comprising a double buffered input register and a double buffered output register corresponding to each connector, each double buffered output register comprising first and second output registers for storing data from the game program executing system for output to a controller connected thereto and each double buffered input register comprising first and second input registers for storing data from a controller connected thereto for input to the game program executing system.

24. The video game system according to claim 23, wherein copying of data from the first output register of one or more of the double buffered output registers to the second output register thereof is timed to start with vertical blanking of a display connected to the video game system.

25. The video game system according to claim 23, wherein the second output registers are locked while data stored therein is output to the controllers connected thereto.

26. The video game system according to claim 23, wherein data written to the first output register from the game program executing system is copied to the second output register.

27. The video game system according to claim 23, wherein data output to each controller comprises a command packet and one or more data packets.

28. The video game system according to claim 23, wherein data input from each controller comprises input data and status data.

29. The video game system according to claim 23, wherein the interface further comprises status registers, each status register indicating a status of a copy operation for copying data from the first output register to the second output register of a corresponding double buffered output register.

30. A video game system, comprising:
a game program executing system supplied with user inputs from one or more game controllers; and
an interface between the controllers and the game program executing system, the interface comprising first and second different storage devices for storing data transferred between the game program executing system and the controllers, and selector circuitry for selectively connecting the controllers to either of the first or second storage devices.

31. The video game system according to claim 30, wherein one of the first and second storage devices is adapted for storing variable size data and the other of the first and second storage devices is adapted for storing fixed size data.

32. The video game system according to claim 30, wherein the first storage device comprises double buffered input and output registers.

33. The video game system according to claim 32, wherein output data from the game program executing system is copied from a first register of the output buffer to a second buffer of the output buffer after the output data is written to the first buffer.

34. The video game system according to claim 32, wherein input data from the controllers is copied from a first buffer of the input buffer to a second buffer of the input buffer after the input data is written to the first buffer.

35. The video game system according to claim 30, further comprising:
a modem connected to the selector circuitry.

36. A method of supplying data to a game program executing system of a video game system from controllers connected thereto, the method comprising:
receiving data from the controllers;
supplying the received data to selector circuitry;
supplying the received data from the selector circuitry to a first storage device accessible by the game program executing system if the selector circuitry is in a first state; and
supplying the received data from the selector circuitry to a different, second storage device accessible by the game program executing system if the selector circuitry is in a second state.

37. The method according to claim 36, wherein fixed-size data received from the controllers is supplied to the first storage device and variable-size data received from the controllers is supplied to the second storage device.

38. A method of supplying data from game program executing system of a video game system to controllers connected thereto, the method comprising:
selectively storing data from the game program executing system in first and second different storage devices connected to selector circuitry;
supplying stored data from the first storage device to the controllers if the selector circuitry is in a first state; and
supplying stored data from the second storage device to the controllers if the selector circuitry is in a second state.

39. The method according to claim 38, wherein fixed-size data from the game program executing system is stored in the first storage device and variable-size data from the game program executing system is stored in the second storage device.

40. A video game system, comprising:
a game program executing system;
a connector for connecting to a peripheral device; and
an interface between the connector and the game program executing system, the interface comprising a double buffered input register and a double buffered output register, wherein
output data from the game program executing system is copied from a first output register to a second output register of the double buffered output register after the output data is written to the first output register, and copying from the first output register to the second output register is selectively lockable, and
input data from the peripheral device is copied from a first input register to a second input register of the double buffered input register after the input data is written to the first input register, and copying from the first input register to the second input register is selectively lockable.

41. The video game system according to claim 40, wherein the interface further comprises a status register comprising one or more bits indicative of a status of a copy operation for copying data from the first output register to the second output register.

42. A video game system, comprising:
a game program executing system;
a connector for connecting to a peripheral device; and
an interface between the game program executing system and the connector, the interface comprising a first storage device for storing data of a first type which is transmitted to or received from a peripheral device connected to the connector; a different, second storage device for storing data of a second type which is transmitted to or received from a peripheral device connected to the connector; and a switching device for selectively connecting the peripheral device to either the first storage device or the second storage device.

43. The video game system according to claim 42, wherein the data of the first type is variable-size data and the data of the second type is fixed-size data.

* * * * *